US009949390B1

(12) United States Patent
Doll et al.

(10) Patent No.: US 9,949,390 B1
(45) Date of Patent: Apr. 17, 2018

(54) ELECTRONIC DEVICE INCLUDING MOVABLE MAGNET BASED ACTUATOR FOR DEFORMING A DISPLAY AND RELATED METHODS

(71) Applicant: Apple Inc., Cupertino, CA (US)

(72) Inventors: Joseph C. Doll, Mountain View, CA (US); Teera Songatikamas, San Jose, CA (US); Adam J. Monkowski, Pleasanton, CA (US); Pavan O. Gupta, Belmont, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/489,926

(22) Filed: Apr. 18, 2017

Related U.S. Application Data

(60) Provisional application No. 62/437,810, filed on Dec. 22, 2016, provisional application No. 62/437,804, filed on Dec. 22, 2016.

(51) Int. Cl.
*G06F 3/01* (2006.01)
*H05K 5/02* (2006.01)
(Continued)

(52) U.S. Cl.
CPC ........... *H05K 5/0217* (2013.01); *G06F 3/016* (2013.01); *H01F 7/064* (2013.01); *H05K 5/0017* (2013.01)

(58) Field of Classification Search
CPC ...................................................... G06F 3/016
See application file for complete search history.

(56) References Cited

U.S. PATENT DOCUMENTS 4,871,992 A * 10/1989 Petersen ............... G09B 21/003
340/4.12
5,136,194 A * 8/1992 Oudet .................... H02K 33/06
310/15
(Continued)

FOREIGN PATENT DOCUMENTS

WO       2013169299 A1       11/2013
WO       2013169303 A1       11/2013
(Continued)

OTHER PUBLICATIONS

Product Specification Sheet: GEEPLUS, VIBRO1 Vibration Actuator, 2 pages, www.geeplus.biz, downloaded on Jul. 15, 2015.

*Primary Examiner* — Adrian S Wilson
(74) *Attorney, Agent, or Firm* — Allen, Dyer, Doppelt + Gilchrist, P.A.

(57) ABSTRACT

An electronic device may include a device housing and a display carried by the device housing. The electronic device may also include an actuator carried between the device housing and the display. The actuator may include an actuator body having an actuator bottom and a sidewall extending upwardly therefrom, a first guide member carried by the actuator bottom and spaced inwardly from adjacent portions of the sidewall to define a channel, and at least one coil carried by the sidewall. The actuator may also include a magnet being moveable within the channel and an actuator top coupled to the magnet and that includes a second guide member cooperating with the first guide member. The electronic device may also include a controller configured to drive the at least one coil to relatively move the actuator bottom and actuator top to thereby deform the display.

23 Claims, 30 Drawing Sheets

(51) Int. Cl.
    *H05K 5/00*         (2006.01)
    *H01F 7/06*         (2006.01)

(56) References Cited

U.S. PATENT DOCUMENTS

| | | | | |
|---|---|---|---|---|
| 5,172,092 | A * | 12/1992 | Nguyen | H04M 19/04 340/384.73 |
| 5,717,423 | A * | 2/1998 | Parker | G06F 3/016 345/108 |
| 6,209,380 | B1 * | 4/2001 | Papazian | B21D 37/02 72/413 |
| 6,734,785 | B2 * | 5/2004 | Petersen | G09B 21/004 340/4.12 |
| 8,169,402 | B2 | 5/2012 | Shahoian et al. | |
| 8,552,997 | B2 | 10/2013 | Paleczny | |
| 8,740,618 | B2 * | 6/2014 | Shaw | G09B 21/004 116/17 |
| 8,803,798 | B2 * | 8/2014 | Jiang | G06F 3/016 345/156 |
| 9,116,546 | B2 * | 8/2015 | Birnbaum | G08B 6/00 |
| 9,465,284 | B2 * | 10/2016 | Herati | G03B 21/562 |
| 2002/0175836 | A1 * | 11/2002 | Roberts | G06F 3/0414 341/34 |
| 2005/0069842 | A1 * | 3/2005 | Schleppenbach | G09B 21/004 434/113 |
| 2008/0024963 | A1 * | 1/2008 | Weksler | G06F 1/1616 361/679.01 |
| 2008/0246735 | A1 * | 10/2008 | Reynolds | G06F 3/016 345/173 |
| 2008/0253081 | A1 * | 10/2008 | Tracy | G06F 1/1616 361/679.5 |
| 2009/0007758 | A1 * | 1/2009 | Schlosser | G06F 3/016 84/436 |
| 2009/0295552 | A1 * | 12/2009 | Shahoian | G06F 3/016 340/407.1 |
| 2011/0234502 | A1 * | 9/2011 | Yun | G06F 3/016 345/173 |
| 2011/0248916 | A1 * | 10/2011 | Griffin | G06F 3/016 345/157 |
| 2012/0243719 | A1 * | 9/2012 | Franklin | G06F 1/1652 381/333 |
| 2014/0002249 | A1 * | 1/2014 | Lim | G06F 3/016 340/407.1 |
| 2014/0197936 | A1 | 7/2014 | Biggs et al. | |
| 2014/0307369 | A1 * | 10/2014 | Lee | H04M 1/0216 361/679.01 |
| 2015/0109223 | A1 | 4/2015 | Kessler et al. | |
| 2015/0116205 | A1 | 4/2015 | Westerman et al. | |
| 2015/0130730 | A1 | 5/2015 | Harley et al. | |
| 2017/0147087 | A1 * | 5/2017 | Pance | G06F 3/0238 |

FOREIGN PATENT DOCUMENTS

| | | |
|---|---|---|
| WO | 2013169305 A1 | 11/2013 |
| WO | 2013170099 A1 | 11/2013 |
| WO | 2013188307 A2 | 12/2013 |
| WO | 2014018111 A1 | 1/2014 |
| WO | 2015020663 A1 | 2/2015 |

\* cited by examiner

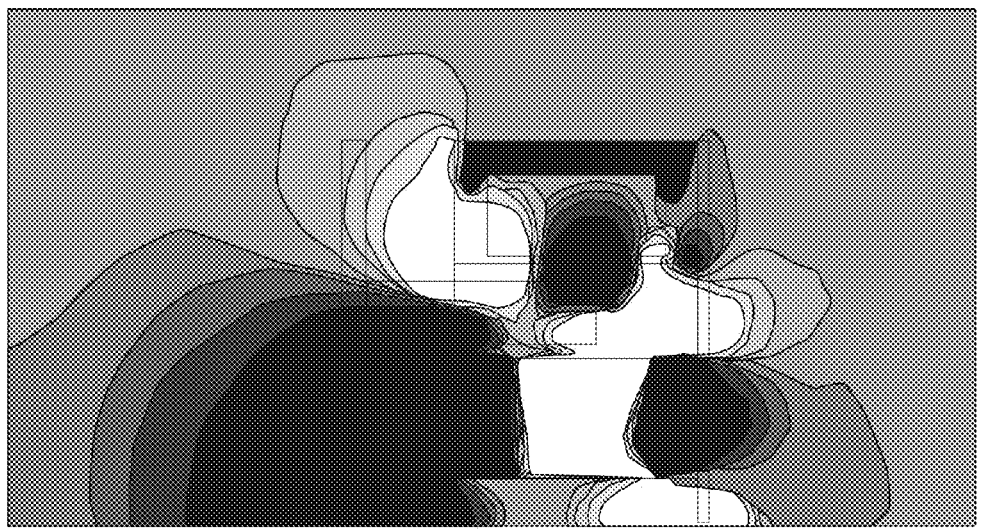
FIG. 15
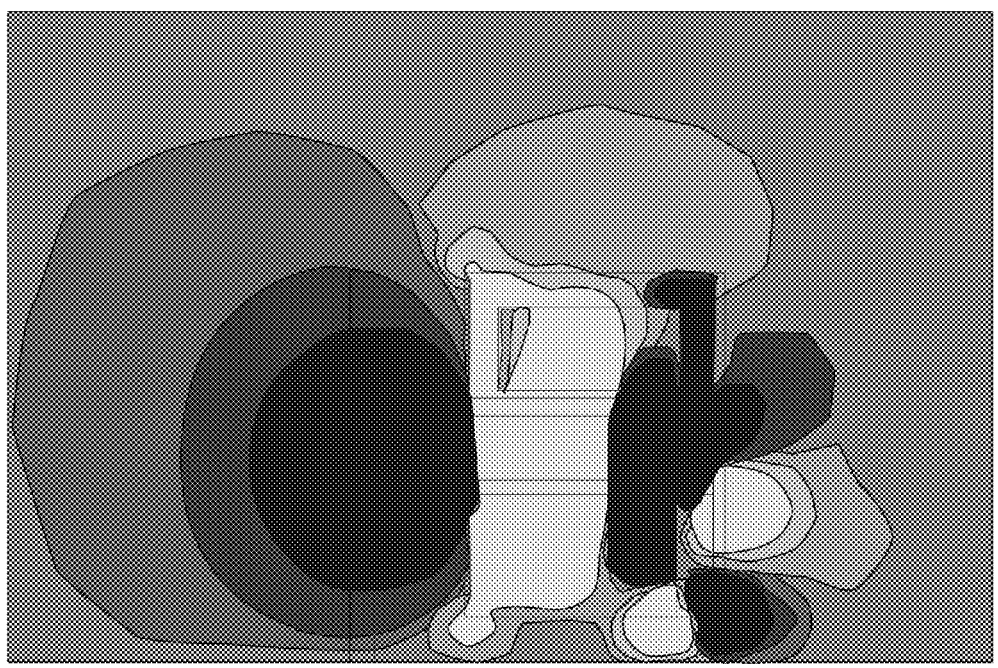
FIG. 14

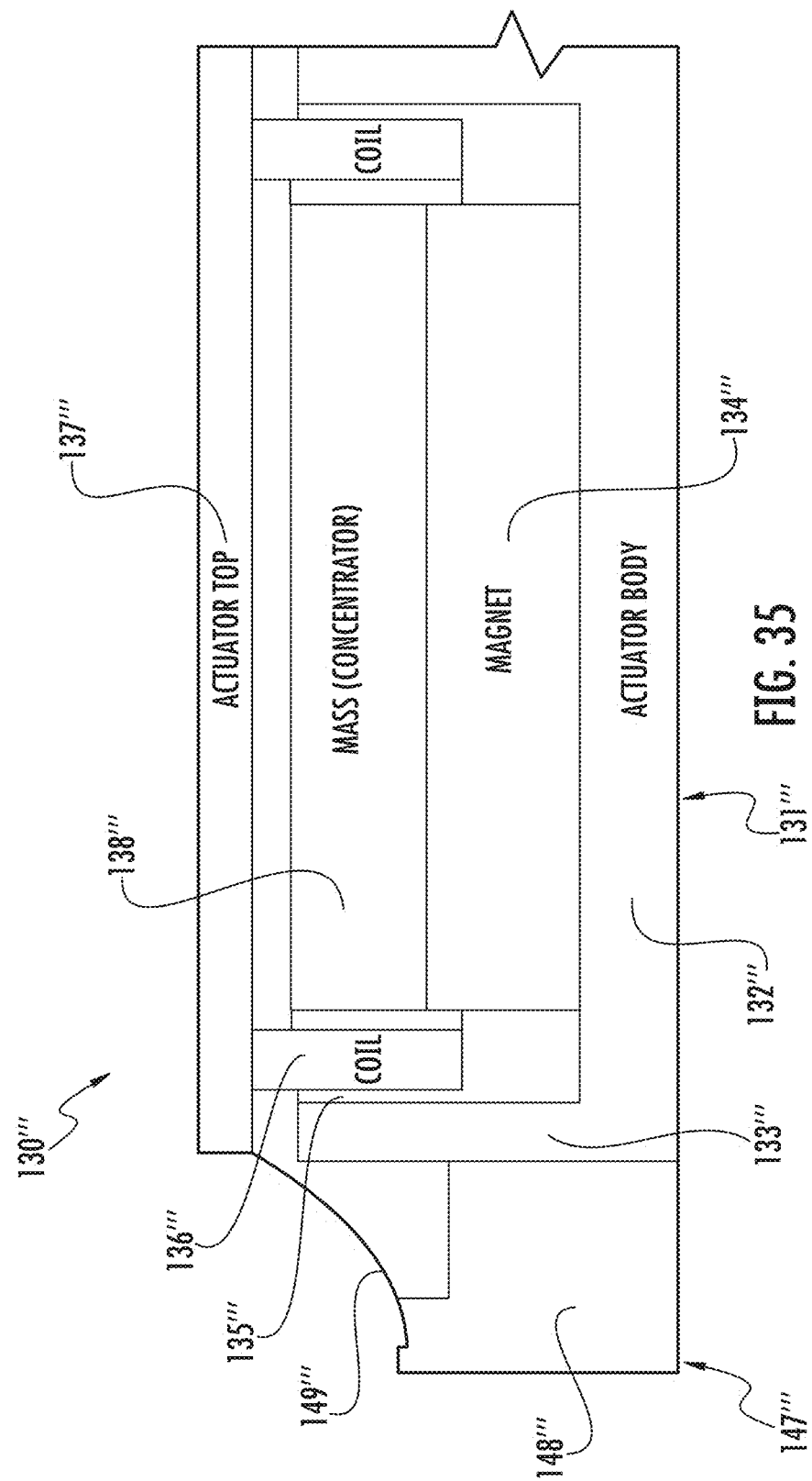

ELECTRONIC DEVICE INCLUDING MOVABLE MAGNET BASED ACTUATOR FOR DEFORMING A DISPLAY AND RELATED METHODS

RELATED APPLICATION

The present application claims the priority benefit of provisional application Ser. No. 62/437,810 filed on Dec. 22, 2016 and provisional application Ser. No. 62/437,804 filed on Dec. 22, 2016, the entire contents of both are herein incorporated in their entirety by reference.

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

An electronic device may include a device housing and a display carried by the device housing. The electronic device may also include an actuator carried between the device housing and the display. The actuator may include an actuator body having an actuator bottom and a sidewall extending upwardly therefrom, a first guide member carried by the actuator bottom and spaced inwardly from adjacent portions of the sidewall to define a channel, and at least one coil carried by the sidewall. The actuator may also include a magnet being moveable within the channel and an actuator top coupled to the magnet and that includes a second guide member cooperating with the first guide member. The electronic device may also include a controller configured to drive the at least one coil to relatively move the actuator bottom and actuator top to thereby deform the display.

The first guide member may include a body having a passageway therein, for example. The second guide member may include a projection received within the passageway of the body.

The actuator may also include at least one biasing member carried within the passageway of the body, for example. The actuator top may include a top plate and a spacer between the top plate and magnet.

The actuator body may include a ferrous material, for example, ferrous steel. The sidewall of the actuator may have a cylindrical shape.

The at least one coil may include copper, for example. The actuator top may include a ferrous material.

The actuator top may include a magnetic actuator top. The magnet may include a permanent magnet. The display may include a touch display.

A method aspect is directed to a method of making an actuator to be coupled between a device housing and a display of an electronic device. The method may include forming an actuator body having an actuator bottom and a sidewall extending upwardly therefrom and positioning a first guide member carried by the actuator bottom and spaced inwardly from adjacent portions of the sidewall to define a channel. The method may also include positioning at least one coil carried by the sidewall, positioning a magnet to be moveable within the channel, and coupling an actuator top to the magnet so that a second guide member cooperates with the first guide member and so that upon driving the at least one coil the actuator top and the actuator bottom relatively move to thereby deform the display.

BRIEF DESCRIPTION OF THE DRAWINGS

FIG. 14 is a graph illustrating simulated flux leakage in the xy-axis plane with an actuator top that include magnetic material or magnetic according to an embodiment.

FIG. 15 is a graph illustrating simulated flux leakage in the z-axis plane with the actuator top of FIG. 14.

FIG. 35 is a schematic cross-sectional view of an actuator according to another embodiment.

DETAILED DESCRIPTION

Figure 1:
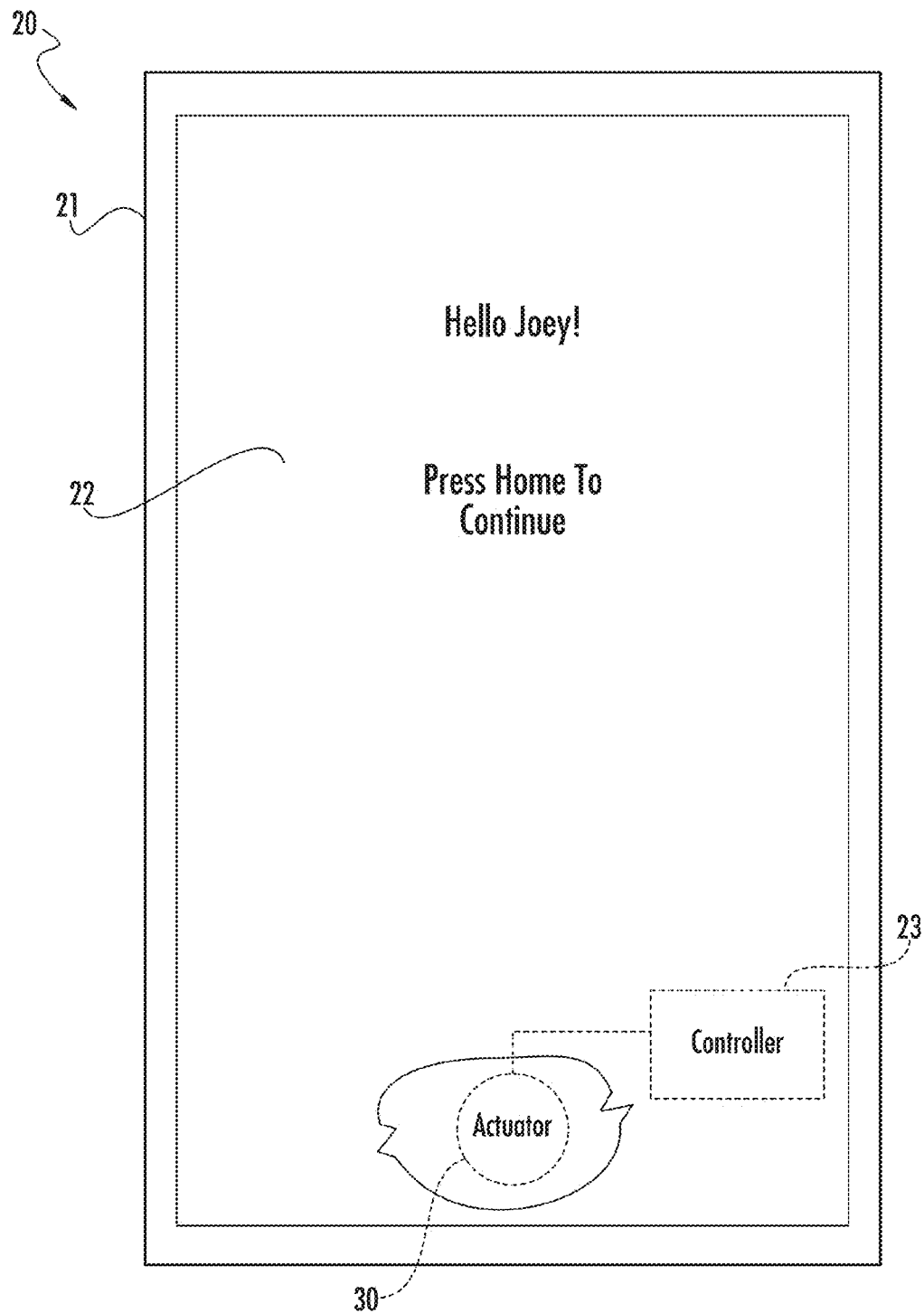
FIG. 1 is a perspective view of an electronic device in accordance with an embodiment.
Figure 2:
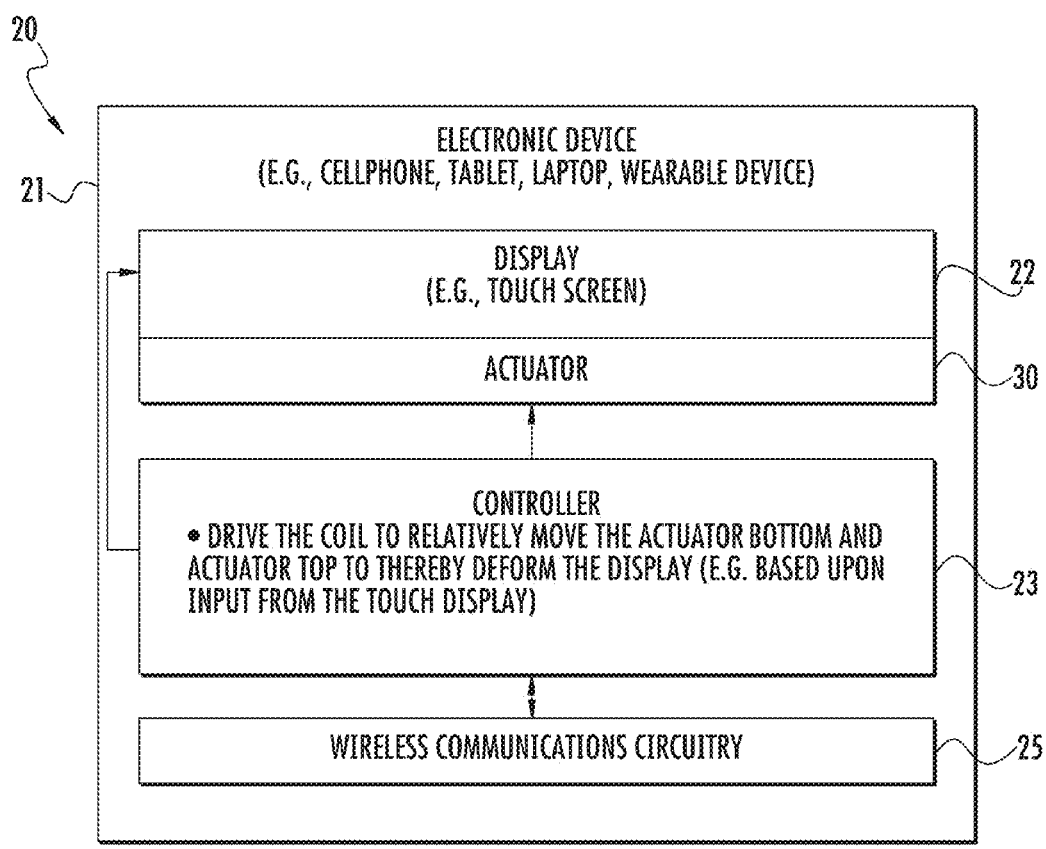
FIG. 2 is a schematic block diagram of the electronic device of FIG. 1.
Figure 3:
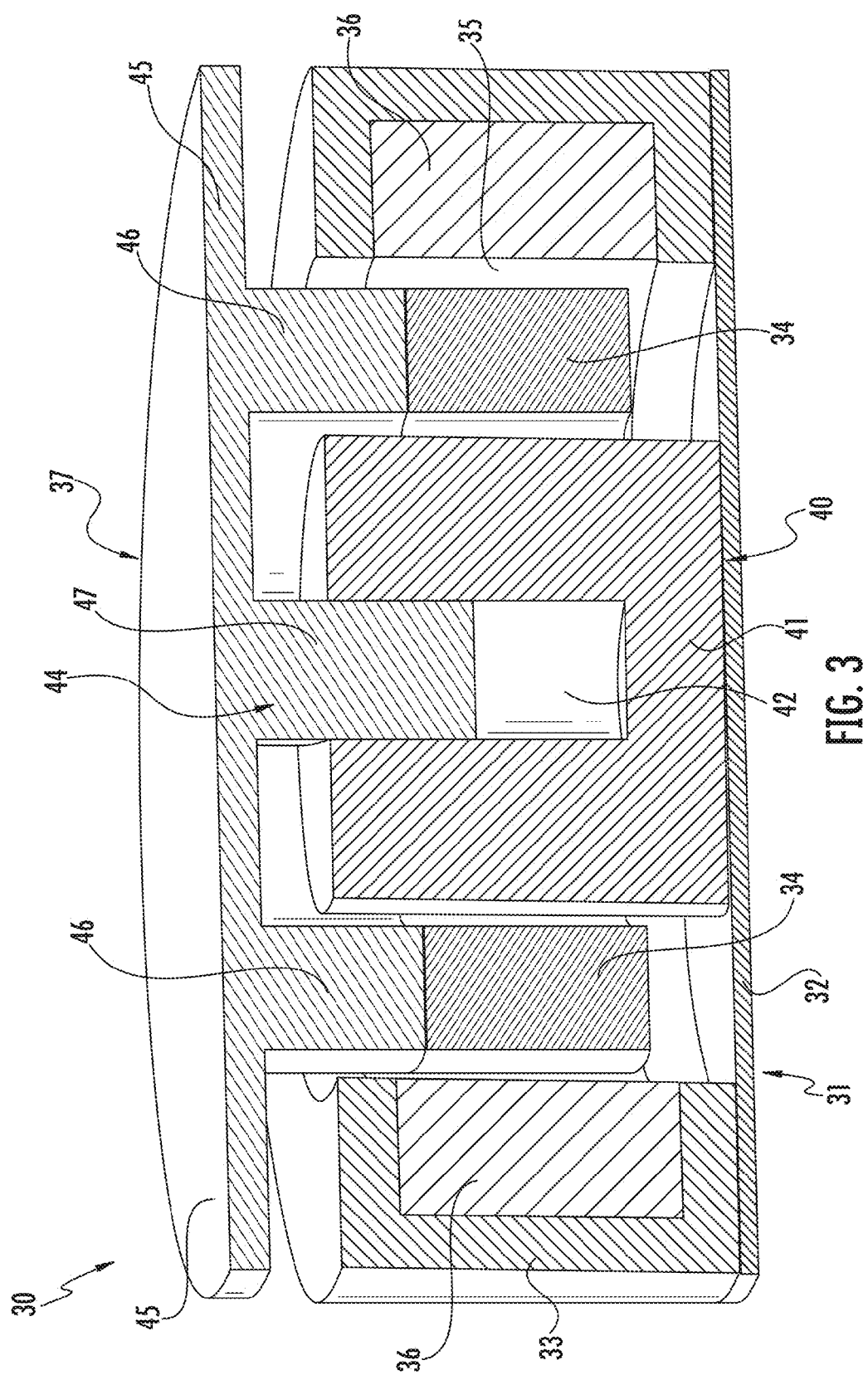
FIG. 3 is a perspective schematic cross-sectional view of an actuator according to an embodiment.
Figure 4:
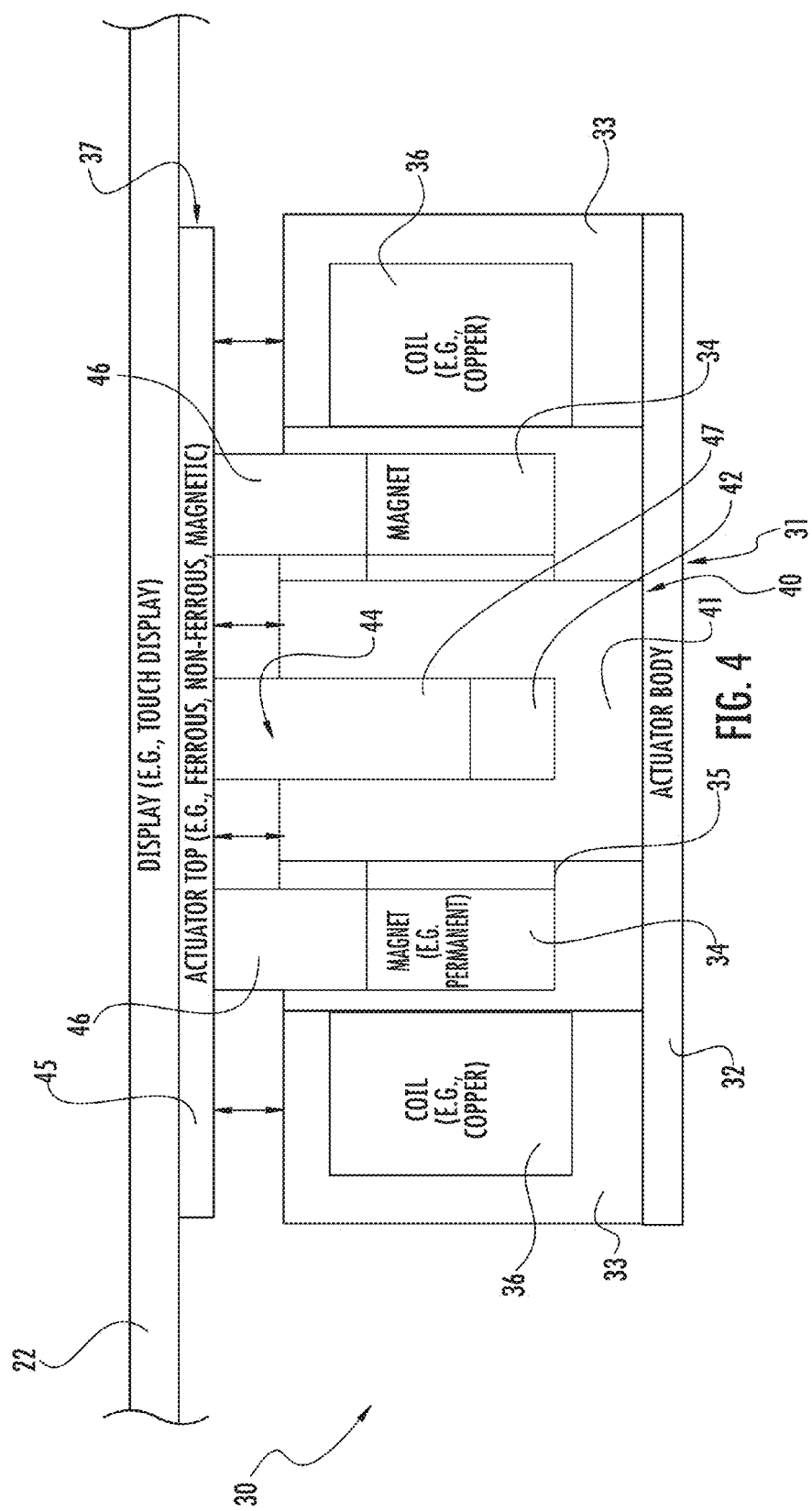
FIG. 4 is a side schematic cross-sectional view of the actuator of FIG. 3.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation and numbers in increments of 100 are used to indicate similar elements in alternative embodiments.

Referring initially to FIGS. 1-4, an electronic device 20 includes a device housing 21 and a display 22 carried by the housing. A controller 23 is also carried by the device housing 21. The electronic device 20 is illustratively in the form of a mobile wireless communications device, such as, for example, a smart telephone. However, the electronic device 20 may be another type of device, for example, a tablet, laptop, or wearable device.

Wireless communications circuitry 25 (e.g. cellular, WLAN Bluetooth, etc.) is also carried within the device housing 21 and coupled to the device controller 23. The wireless communications circuitry 25 cooperates with the device controller 23 to perform at least one wireless communications function, for example, for voice and/or data. In some embodiments, the electronic device 20 may not include wireless communications circuitry 25.

A display 22 is also carried by the device housing 21 and is coupled to the controller 23. The display 22 may be a liquid crystal display (LCD), for example, or may be another type of display, as will be appreciated by those skilled in the art. The display 22 may include glass or other materials, for example, that may deform when a localized force is applied thereto. The display 22 may also be in the form of a touch display, for example, and be responsive to user input or touching, as will be appreciated by those skilled in the art.

The electronic device 20 may also include additional and/or other types of input devices carried by the device housing 21, for example, a pushbutton switch. The other and/or additional input devices may cooperate with the controller 23 to perform a device function in response to operation thereof. For example, a device function may include a powering on or off of the electronic device 20, initiating communication via the wireless communications circuitry 25, and/or performing a menu function.

The electronic device 20 also includes an actuator 30 coupled between the device housing 21 and the display 22. The actuator 30 includes an actuator body 31 having an actuator bottom 32 and a sidewall 33 extending upwardly therefrom. The sidewall 33 illustratively has a cylindrical shape. The sidewall 33 may have another shape. The actuator body 31 may include a ferrous material, for example, ferrous steel. The actuator body 31 may include other and/or additional materials. For example, the actuator bottom 32 may include ferromagnetic material or non-ferromagnetic material, while the sidewall 33 may include ferromagnetic material.

The actuator 30 also includes a first guide member 40 that is carried by the actuator bottom 32 and is spaced inwardly from adjacent portions of the sidewall 33 to define a channel 35. The first guide member 40 includes a body 41 having a passageway 42 therein.

A coil 36 is carried by the sidewall 33. More particularly, the coil 36 is carried within the sidewall and is flush therewith. The coil 36 may include copper, for example. The coil 36 may include other and/or additional materials. Moreover, while a single coil 36 is illustrated, it should be understood that the actuator 30 may include more than one coil.

A magnet 34 is moveable within the channel 35. The magnet 34 may be a permanent magnet, for example. The magnet 34 may be an NdFeB magnet, for example, and may be polarized in-plane, as will be appreciated by those skilled in the art. Of course, the magnet 34 may be another type of magnet. While the magnet 34 is illustrated in the form of a single magnet body, the magnet may be in the form of multiple magnetic segments or bodies.

The actuator 30 also includes an actuator top 37 coupled to the magnet 34. The actuator top 37 illustratively includes a top plate 45 and a spacer 46 between the top plate and the magnet 34. The sizing, for example, length of the spacer 46 may vary, as will be appreciated by those skilled in the art. The actuator top 37 also includes a second guide member 44 that cooperates with the first guide member 40. The actuator top 37, including the second guide member 44, may include ferrous material and/or may be magnetic, for example. The actuator top 37 may include other and/or additional materials. The actuator top 37 may conceptually be considered a mass or force spreader, for example.

Figure 5:
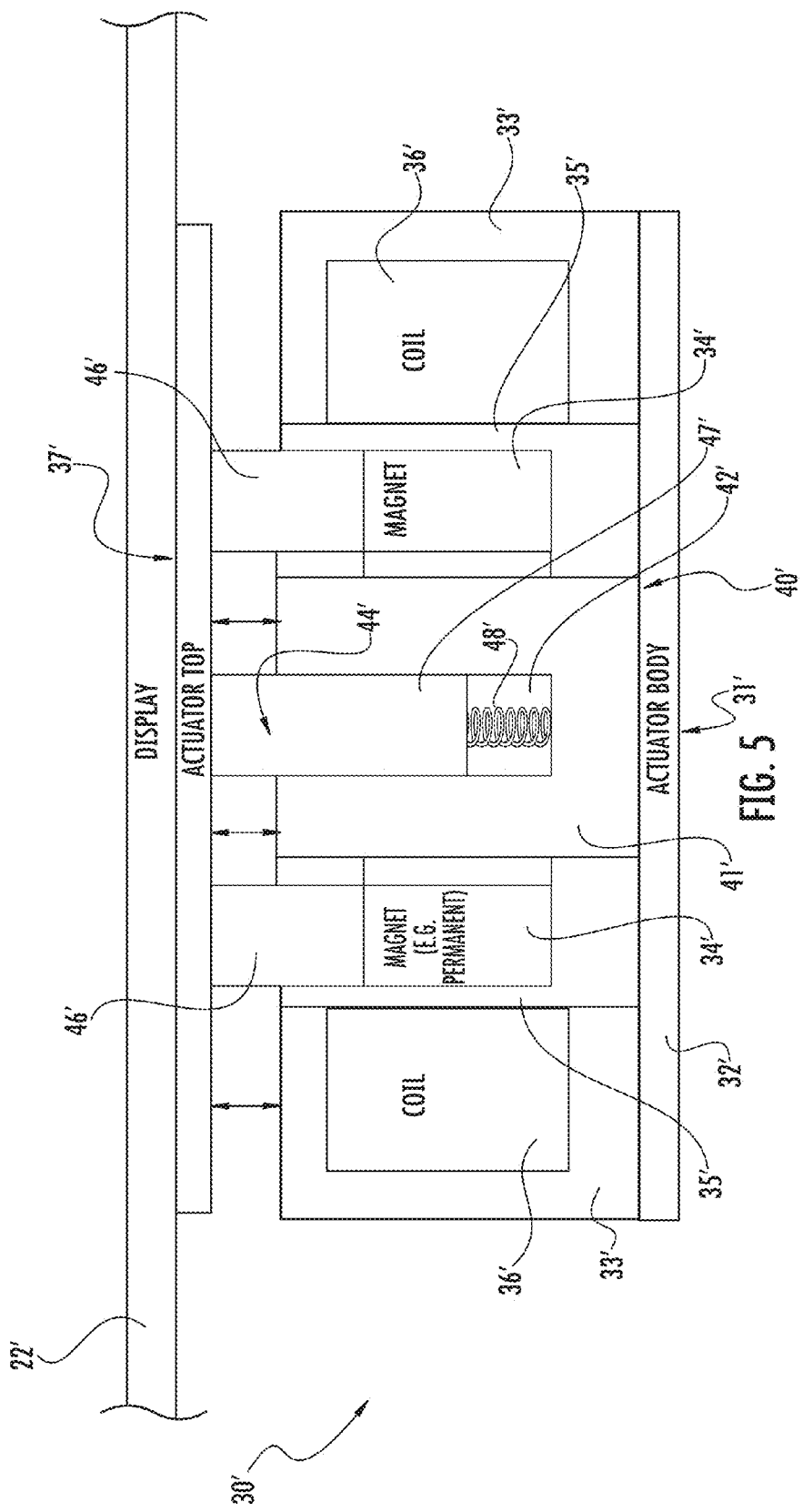
FIG. 5 is a side schematic cross-sectional view of the actuator according to another embodiment.

The second guide member 44 includes a projection 47 that is received within the passageway 42 of the body 41. The first and second guide members 40, 44 provide or define a guide interface that may increase stabilization in the x-axis and y-axis directions, as will be appreciated by those skilled in the art. The guide interface provided by the first and second guide members 40, 44 may be considered a friction guided interface, for example. However, the first and second guide members 40, 44 may define a frictionless interface, in which case, with brief reference to FIG. 5, a biasing member 48' may be carried within the passageway 42' of the body 41'. The biasing member 48' is illustratively in the form of a spring. However, other types of biasing members 48' may be used or carried within the passageway 42' of the body 41'. Additional biasing members 48' may be used and/or the biasing members may be located elsewhere, for example, between the actuator top 37' and the first guide member 40' or sidewall 33' and/or in the channel 35'.

It should be understood that while a particular arrangement of the first and second guide members 40, 44 is illustrated, there may be other arrangements or guiding techniques, for example, the second guide member may have a projection and the first guide member may have a passageway. Of course, the first and second guide members 40, 44 may not include a passageway and projection, but rather other and/or additional guides, such as, for example, tracks, guide members, etc.

The controller 23 is configured to drive the coil 36 to relatively move the actuator bottom 32 and actuator top 37 to thereby deform the display 22. In other words, in operation, when haptic feedback is desired, the controller 23 drives the coil 36 so that the actuator top 37 moves away from or toward the bottom 32 of the actuator body 31 to apply a force, for example, from the backside, of the display 22 causing it to deform. If the controller 23 drives the coil 36 to move the actuator bottom 32 toward the actuator top 37 to thereby deform the display, it may be desirable that the actuator top be secured to the display 22, for example, by adhesive or other bonding or securing techniques. When the display 22 is in the form of a touch display, the controller 23 may drive the coil 36 to move the actuator bottom 32 and the actuator top 37 to deform the display based upon input from the touch display, for example.

For example, the controller 23 may drive the coil 36 to move the actuator bottom 32 and actuator top 37 at a desired frequency to generate a desired force and type of haptic feedback. As will be appreciated by those skilled in the art, the waveform generated by the controller 23 for driving the actuator 30 determines the type of haptic feedback (e.g., how the feedback feels to a user). For example, the controller 23 may drive the actuator for a desired feedback (e.g., tap, vibe). The controller 23 may also drive the actuator 30 to deform the display 22 so that a user's finger when placed on the display adjacent the actuator, may feel as if there is a corresponding input device (e.g., pushbutton switch) by way of the deformation. Accordingly, when the display 22 is in the form of a touch display, user input adjacent the actuator 30 may perform functions, for example, of that of a "home" button.

Figure 6:
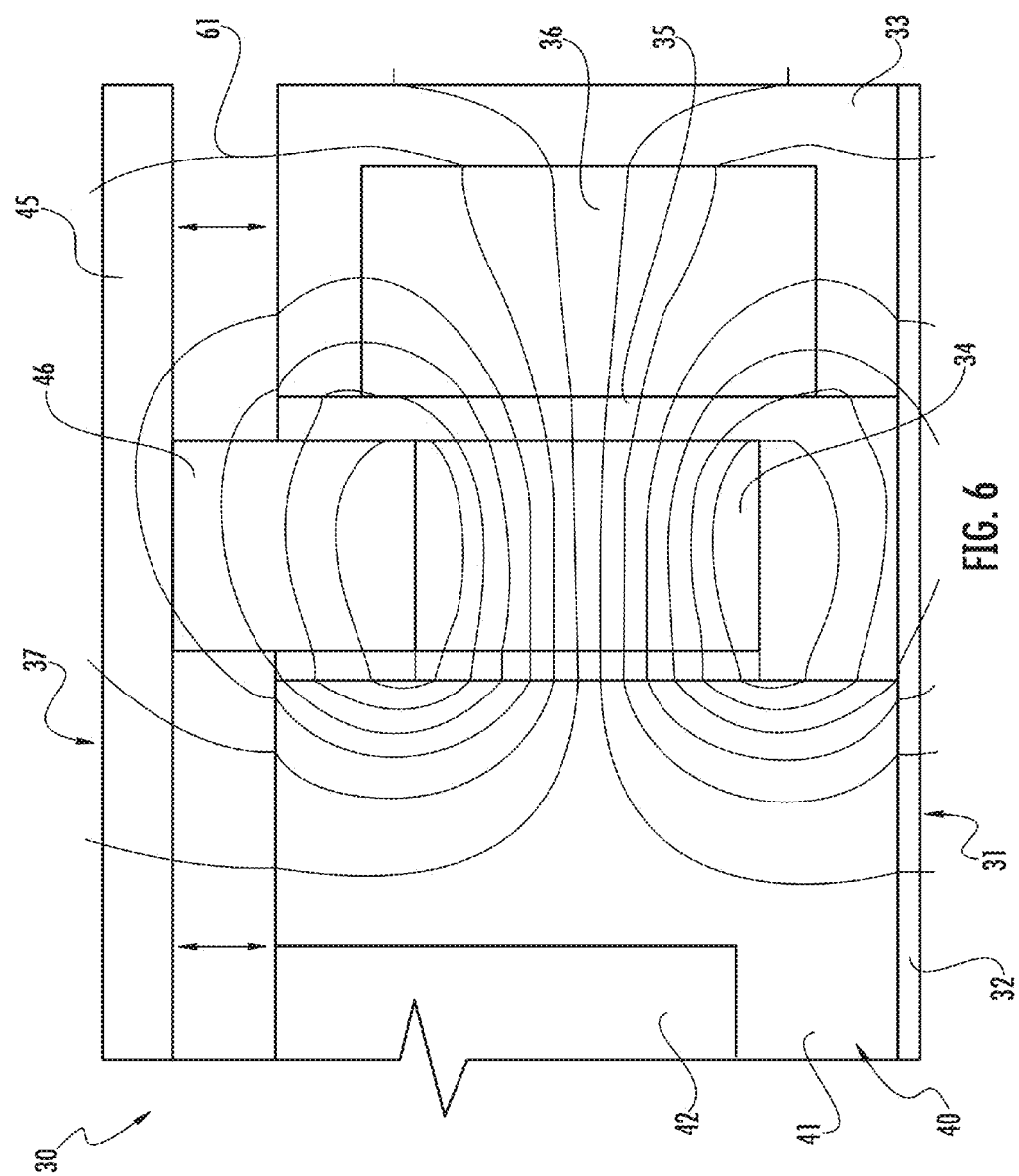
FIG. 6 is a diagram illustrating simulated magnetic flux lines with the coil of an actuator not being driven according to an embodiment.
Figure 7:
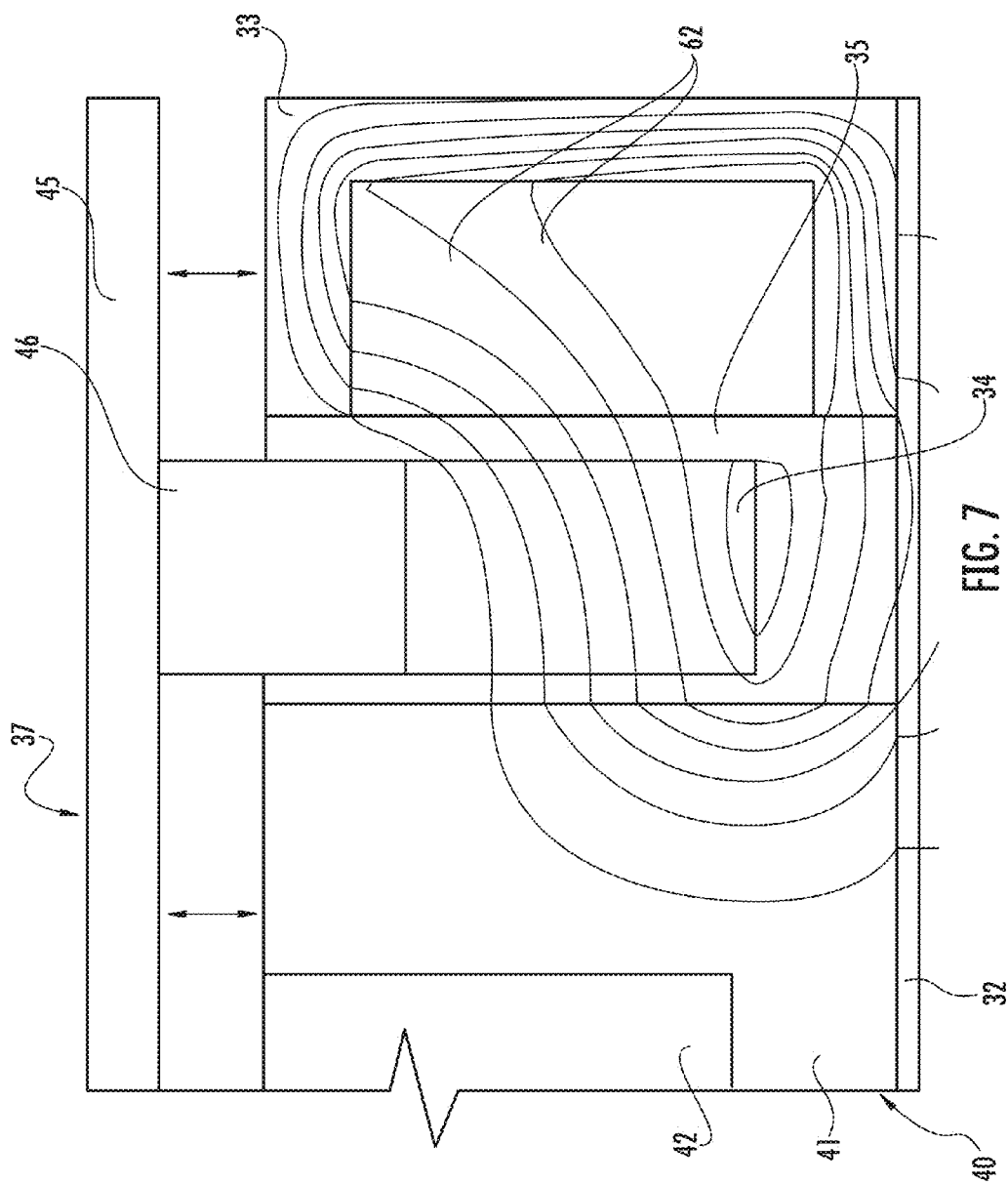
FIG. 7 is a diagram illustrating simulated magnetic flux lines with the coil of an actuator not being driven according to an embodiment.
Figure 8:
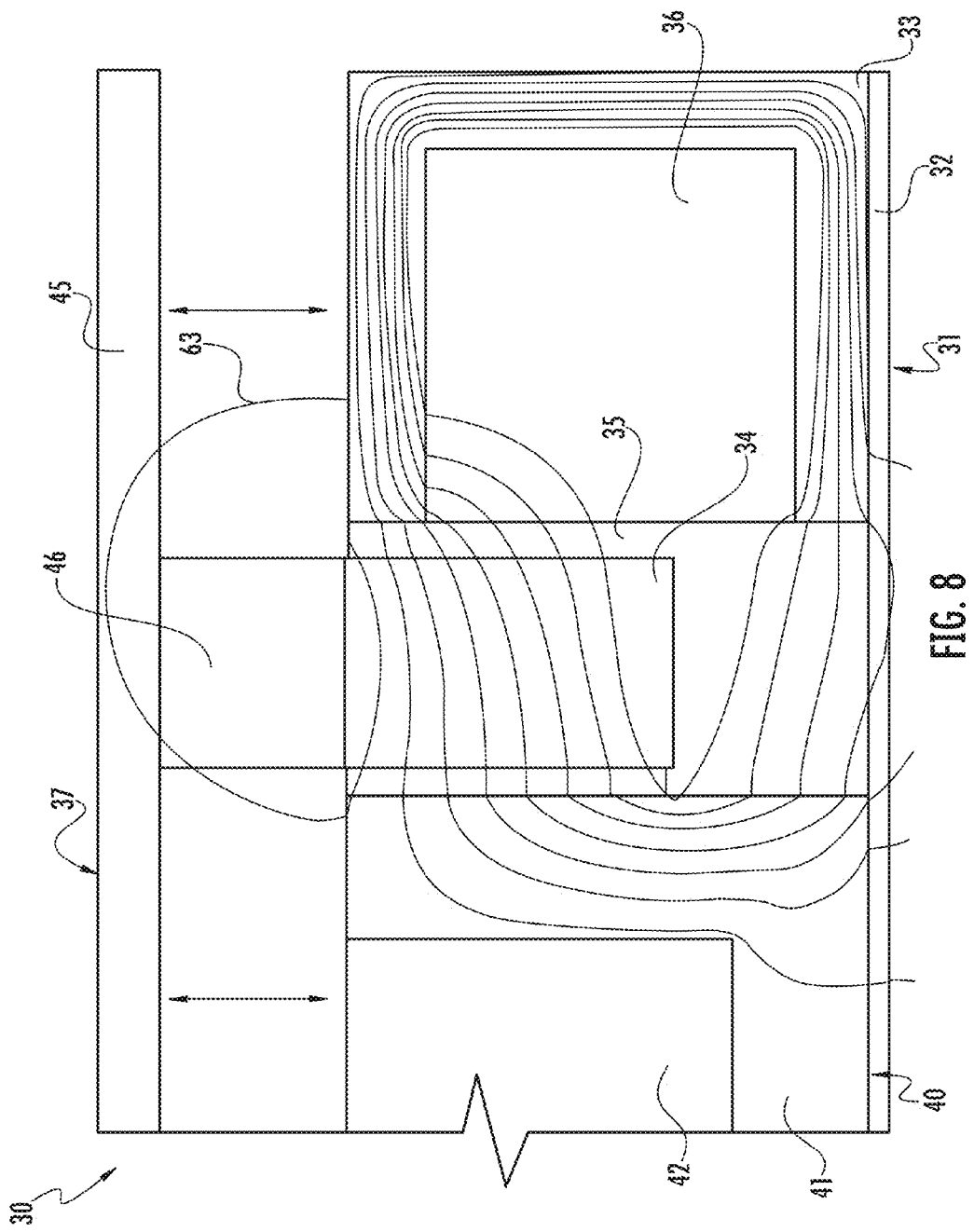
FIG. 8 is a diagram illustrating simulated magnetic flux lines with the coil of an actuator not being driven according to an embodiment.

Referring to FIGS. 6-8 simulated magnetic flux lines 61, 62, 63 are illustrated. FIG. 6 illustrates flux lines 61 with the coil 36 not being driven (i.e., coil off), which results in a net-zero force on the magnet 34. FIG. 7 illustrates magnetic flux lines 62 with the coil 36 being driven (i.e., coil on), which results in a net upward force on the magnet 34, which relatively moves the actuator bottom 32 and actuator top 37 (i.e., moves the actuator bottom and top apart). TAs will be appreciated by those skilled in the art, force on the magnet 34 may be calculated from energy minimization. For example, $F_z=dU/dz$, where U=integral ($B^2/2\mu$, dV). FIG. 8 illustrates the flux lines 63 with the coil 36 being driven and the actuator top 37 being at a different position along its path of travel relative to its position in FIG. 7. As will be appreciated by those skilled in the art, the actuator 30 is based upon a reluctance motor principle, and not the Lorentz force, for example, that may be the basis for a voice coil motor.

Figure 9:
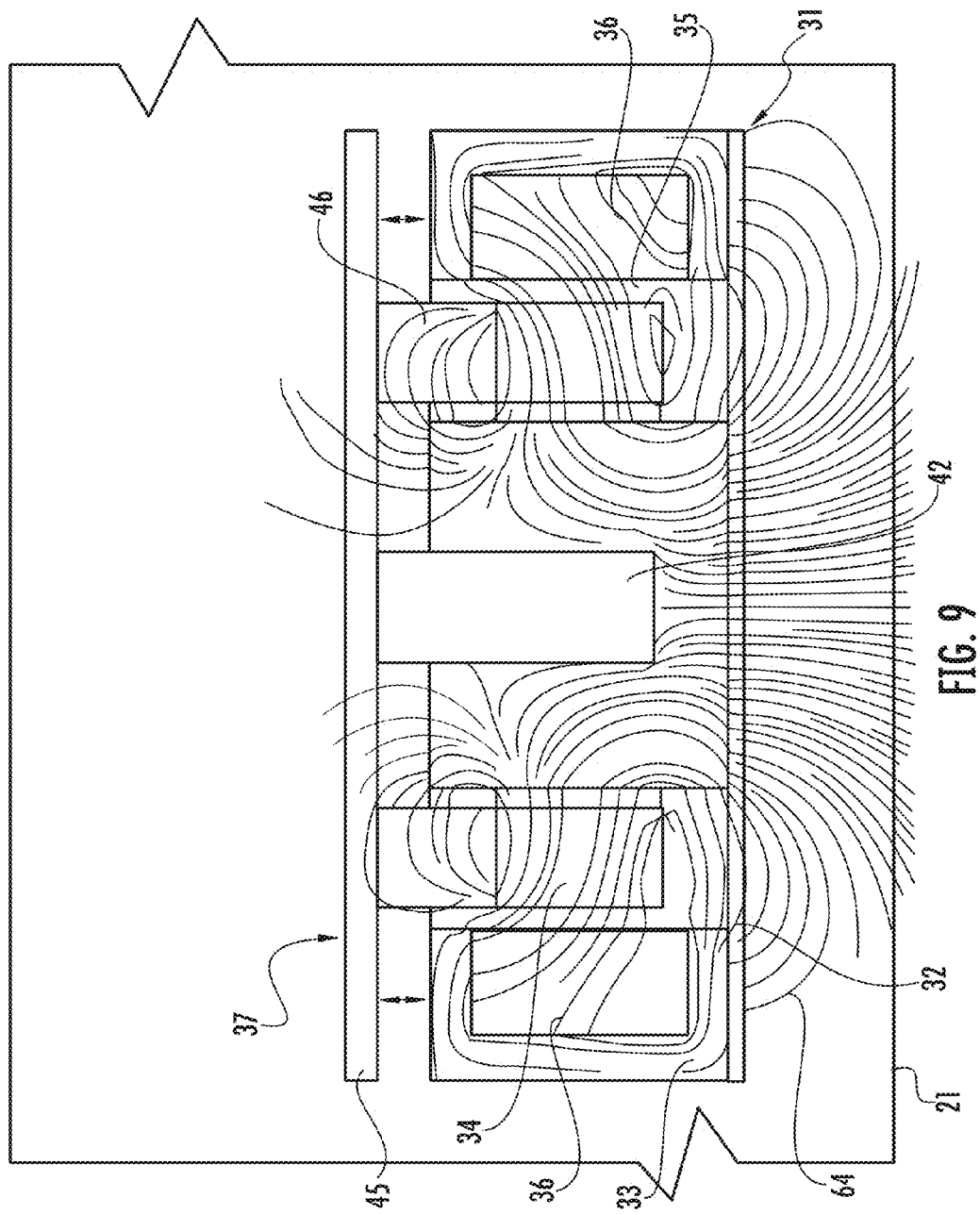
FIG. 9 is a diagram illustrating flux leakage beyond an actuator according to an embodiment and into the device housing.

As described above and illustrated in FIGS. 6-8, the magnetic field generated by the magnet 34 forms a loop in three-dimensional space, and thus, the field magnitude may be characterized by its magnetic flux density. Referring to FIG. 9, a portion of the flux 64 may leak beyond the actuator 30 and beyond the device housing 21, potentially affecting nearby objects that may be sensitive to magnetic fields (e.g., credit cards, pacemakers). Accordingly, it may be desirable to control any undesired magnetic flux leakage.

Figure 11:
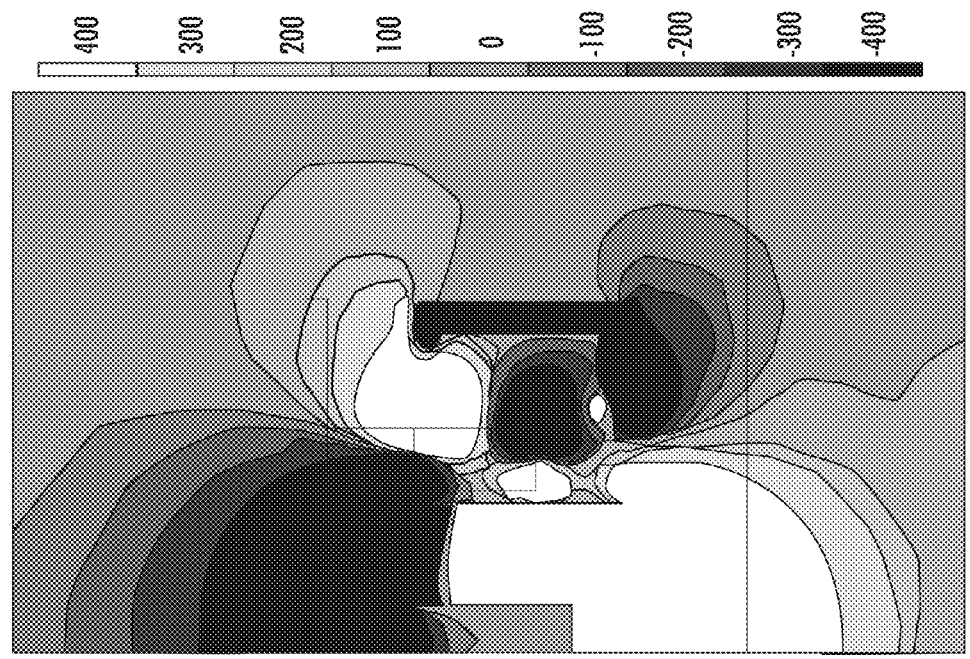
FIG. 11 is a graph illustrating simulated flux leakage in the z-axis plane with the actuator top of FIG. 10.
Figure 10:
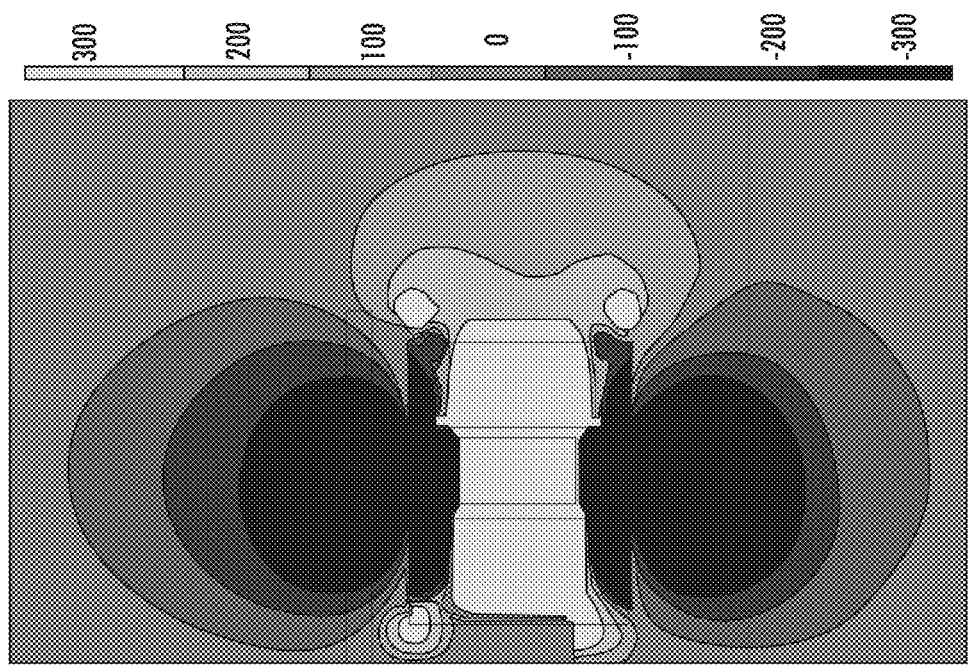
FIG. 10 is a graph illustrating simulated flux leakage in the xy-axis plane with an actuator top that does not include magnetic or ferromagnetic material according to an embodiment.
Figure 13:
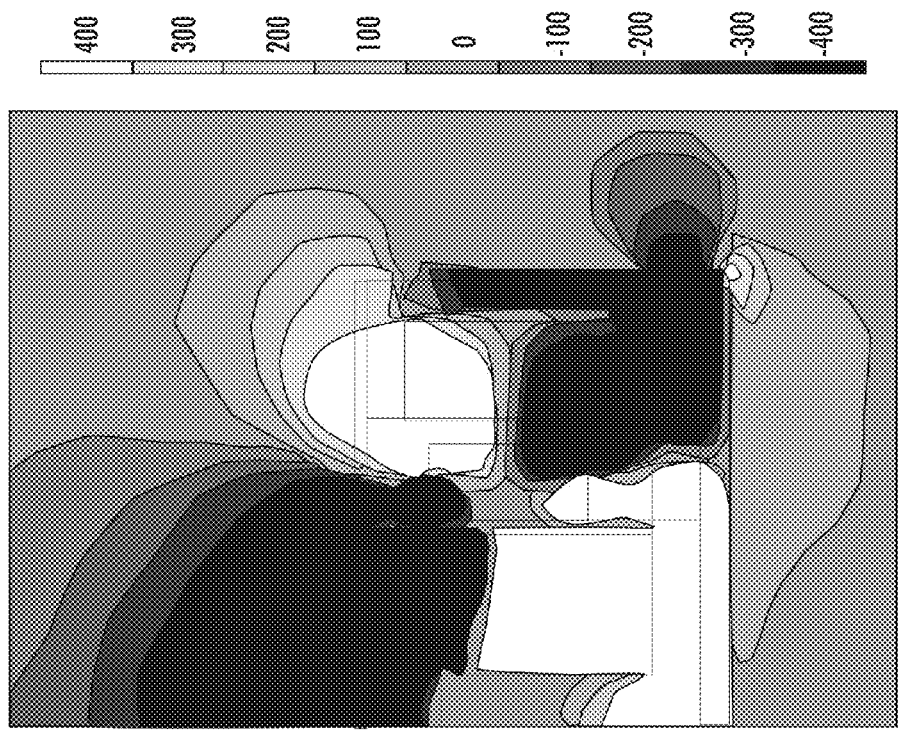
FIG. 13 is a graph illustrating simulated flux leakage in the z-axis plane with the actuator top of FIG. 12.
Figure 12:
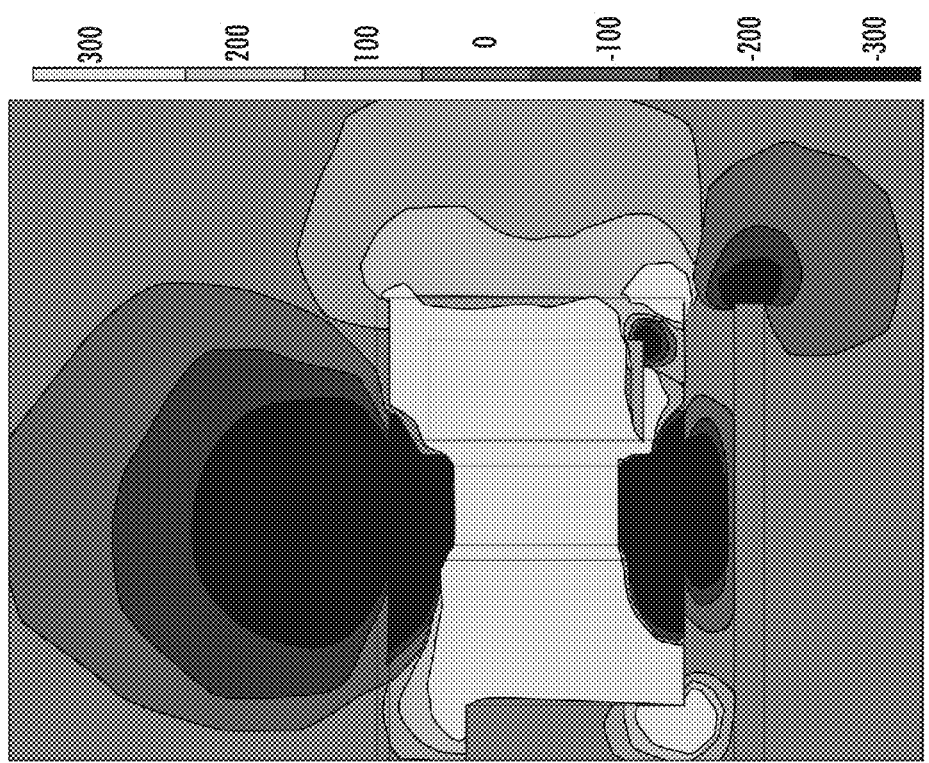
FIG. 12 is a graph illustrating simulated flux leakage in the xy-axis plane with an actuator top that includes ferromagnetic material according to an embodiment.

To address the magnetic flux leakage, in some embodiments, the actuator top may be magnetic or include ferromagnetic material. Referring to FIGS. 10 and 11, simulated flux leakage in the xy-axis and z-axis planes with an actuator top that does not include magnetic or ferromagnetic material is illustrated. FIGS. 12 and 13 illustrate simulated flux leakage in the xy-axis and z-axis planes with an actuator top that includes ferromagnetic material. It should be noted that the actuators that are the basis for the simulated flux lines in FIGS. 12 and 13 are flipped or inverted relative to the corresponding simulated flux leakage in FIGS. 10 and 11. FIGS. 14 and 15 illustrate simulated flux leakage in the xy-axis and z-axis planes with an actuator top that that includes magnetic material (i.e., is magnet-based).

Figure 16:
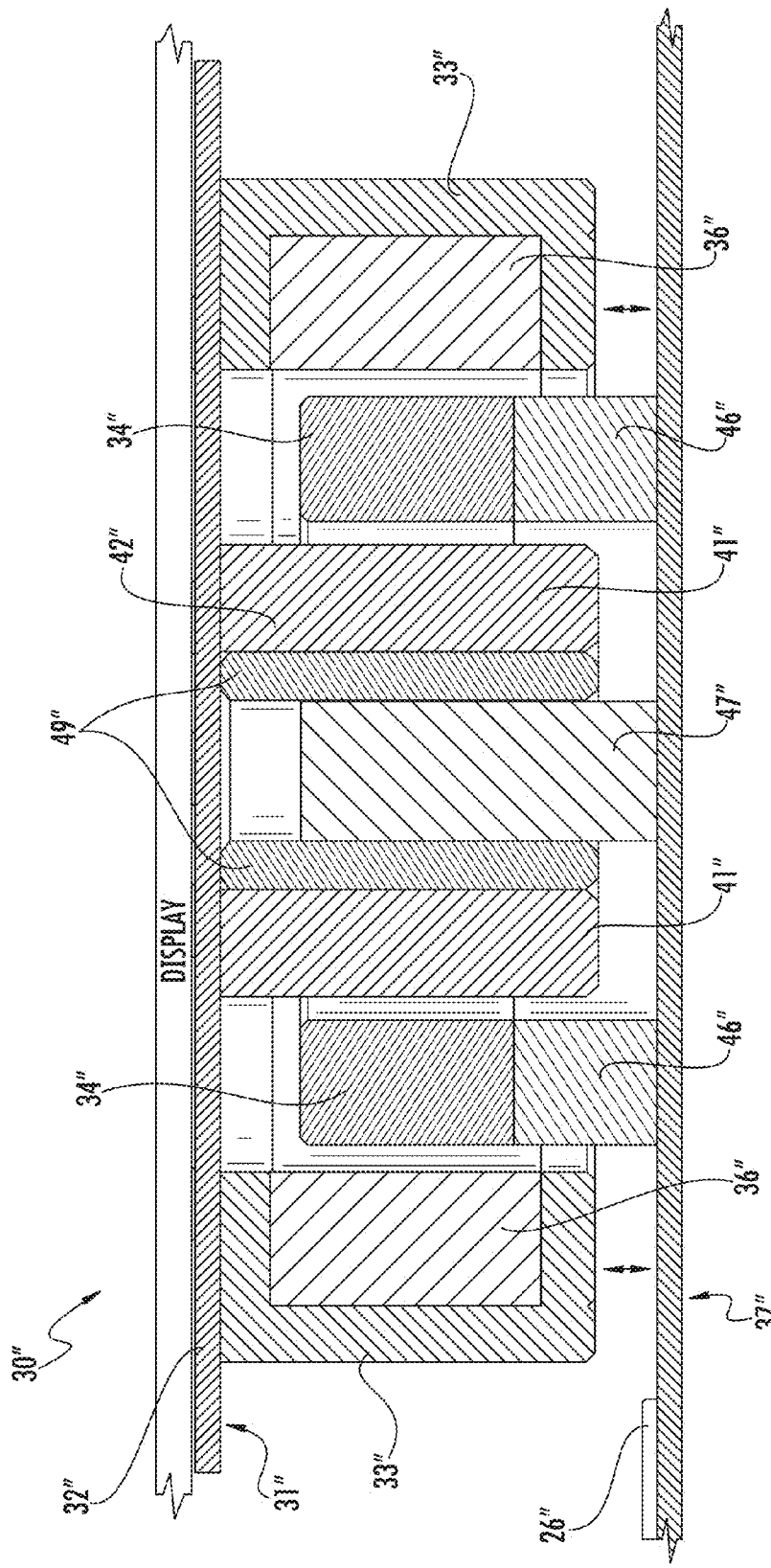
FIG. 16 is a side schematic cross-sectional diagram of an actuator in accordance with an embodiment.
Figure 17:
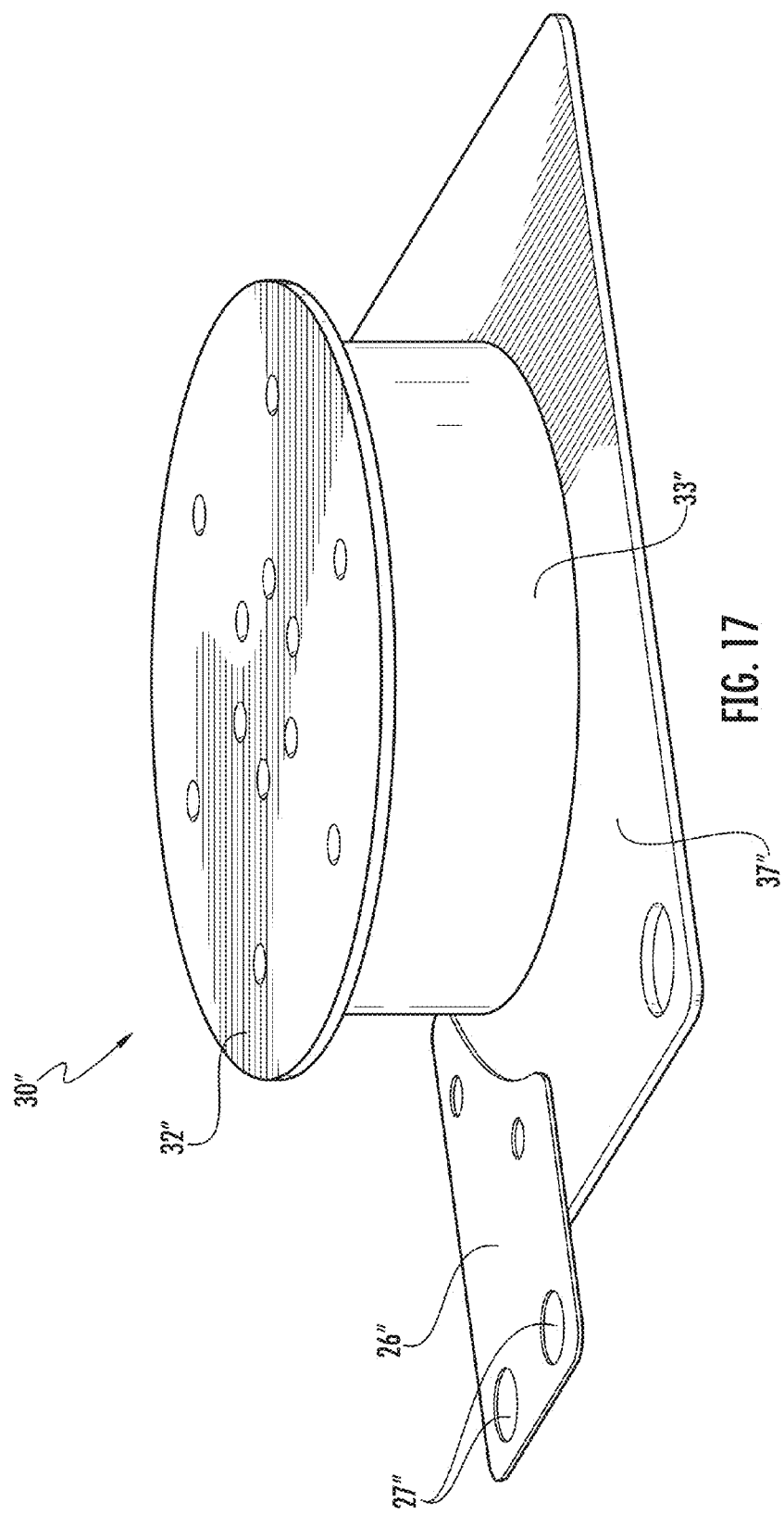
FIG. 17 is a perspective view of the actuator of FIG. 16.
Figure 18:
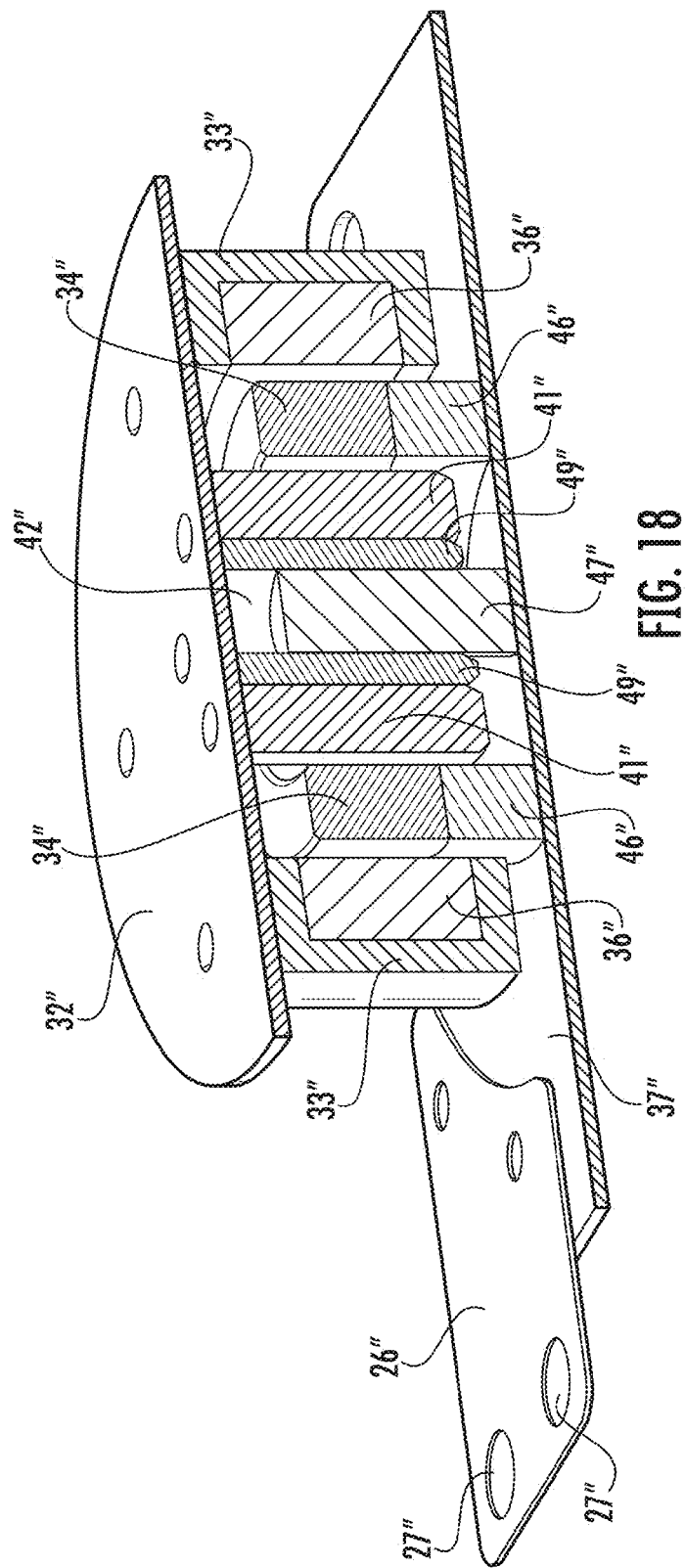
FIG. 18 is a perspective cross-sectional diagram of the actuator of FIG. 16.

Referring now to FIGS. 16-18, in another exemplary embodiment, another embodiment of an actuator 30" is illustrated. The actuator 30" may be carried within the device housing 21" inverted or upside down relative to previously described embodiments. In other words, the actuator top 37" and magnet 34" may be positioned adjacent the device housing 21" while the actuator body 31", first guide member 40", and coil 36" are adjacent the display 22" so as to be movable relative to the actuator top. In other words, conceptually, the actuator top 37" may be considered stationary within the device housing 21" and the actuator body 31" along with the first guide member 40" and the coil 36" may be considered moving to deform the display 22".

Additionally, a bearing insert 49" may be carried within the passageway 42" of the first guide member 40". In other words, the bearing insert 49" may be carried between the second guide member 44" and the first guide member 40" within the passageway 42". The bearing insert 49" maintains alignment during assembly, operation, or dropping of the actuator 30". The actuator body 31" and first guide member 40" may be formed as a single or monolithic unit or may be in the form of multiple discrete segments.

The actuator top 37" in the present embodiment may define a bottom plate that may be larger that the actuator body 31" and may couple to a connector 26", which may be flexible, and that includes connection points 27" (e.g., solder points) (FIGS. 17 and 18).

Figure 19:
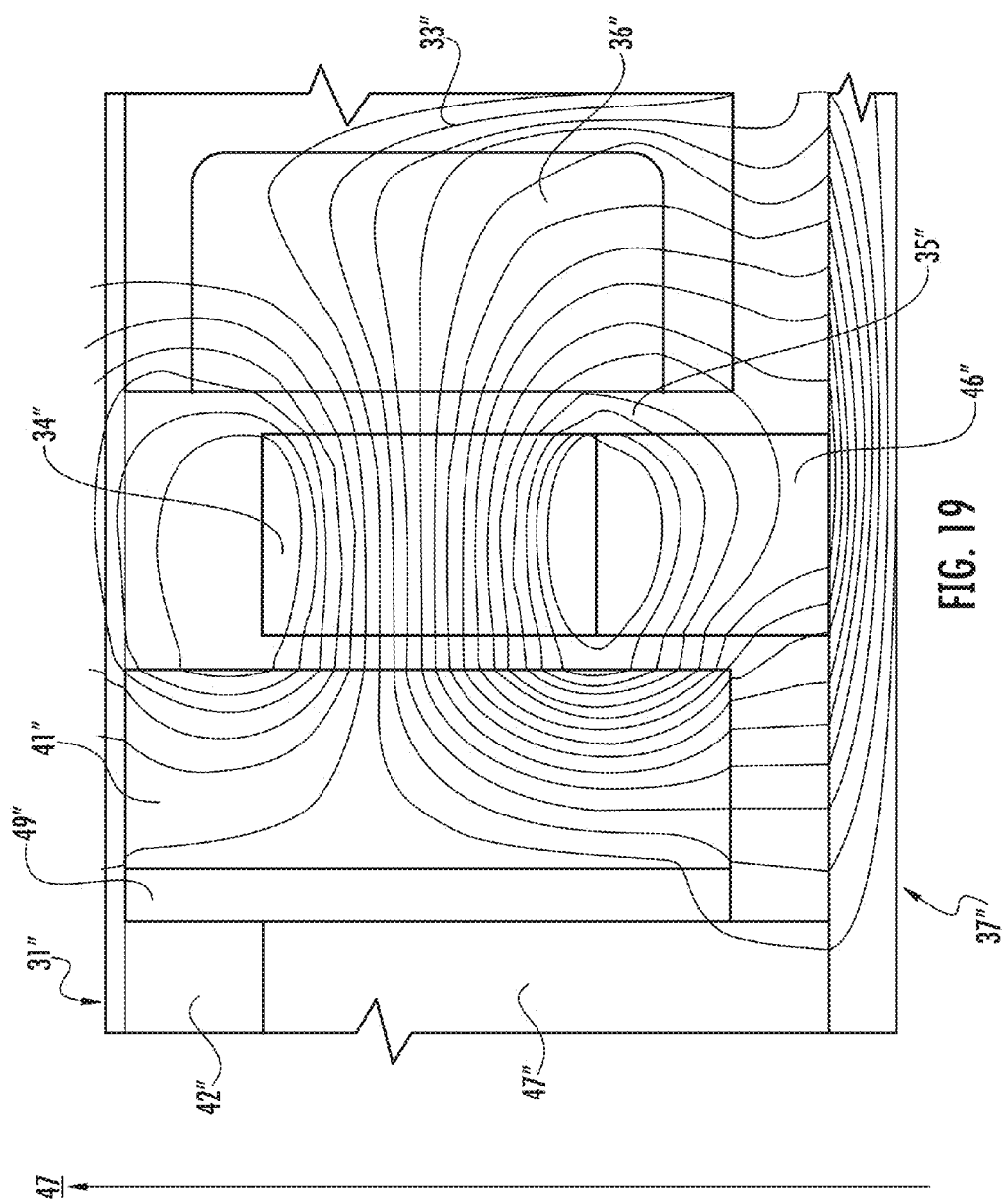
FIG. 19 is a diagram illustrating simulated flux lines with the coil of the actuator of FIG. 16 not being driven.
Figure 20:
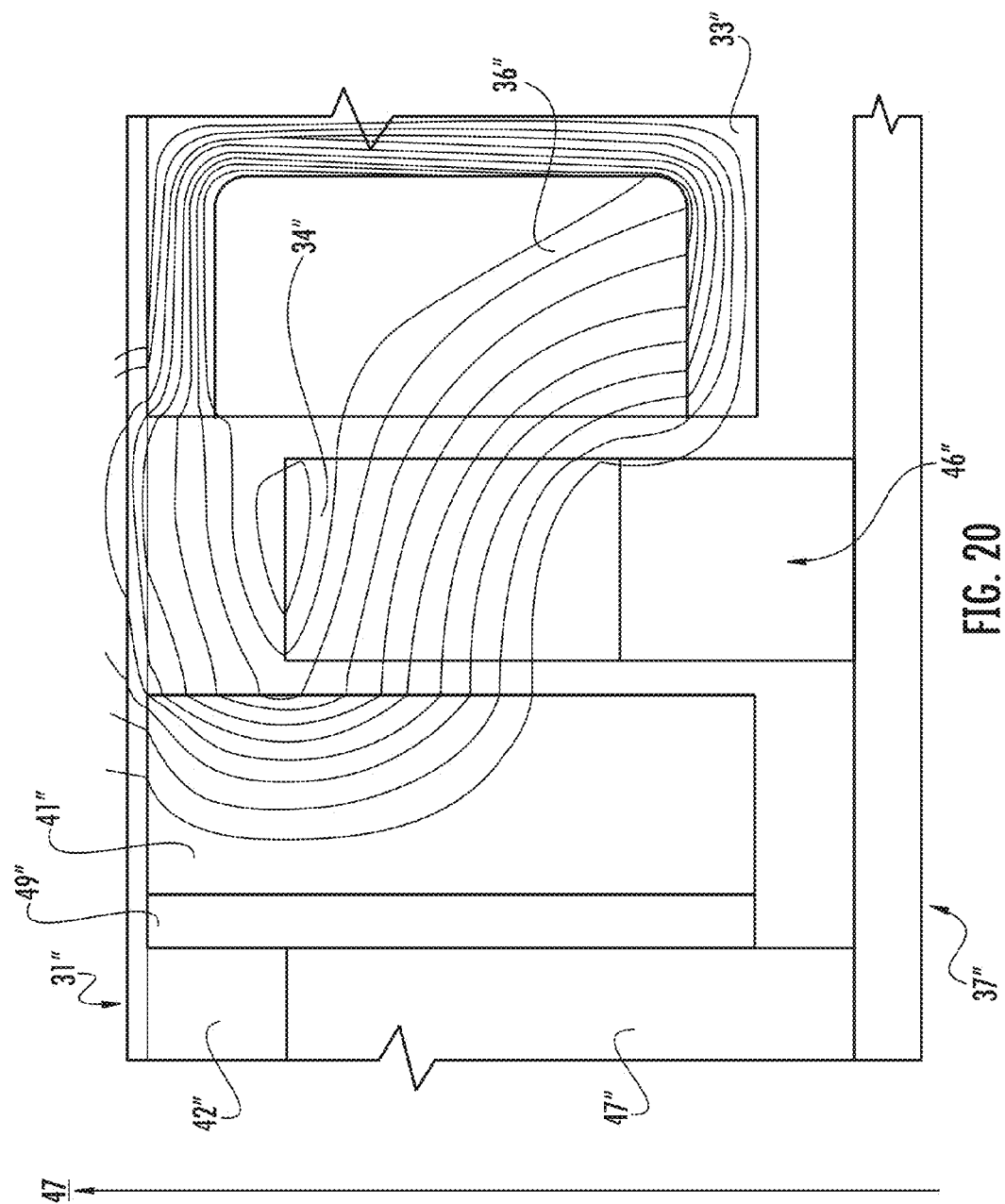
FIG. 20 is a diagram illustrating simulated flux lines with the coil of the actuator of FIG. 16 being driven.
Figure 21:
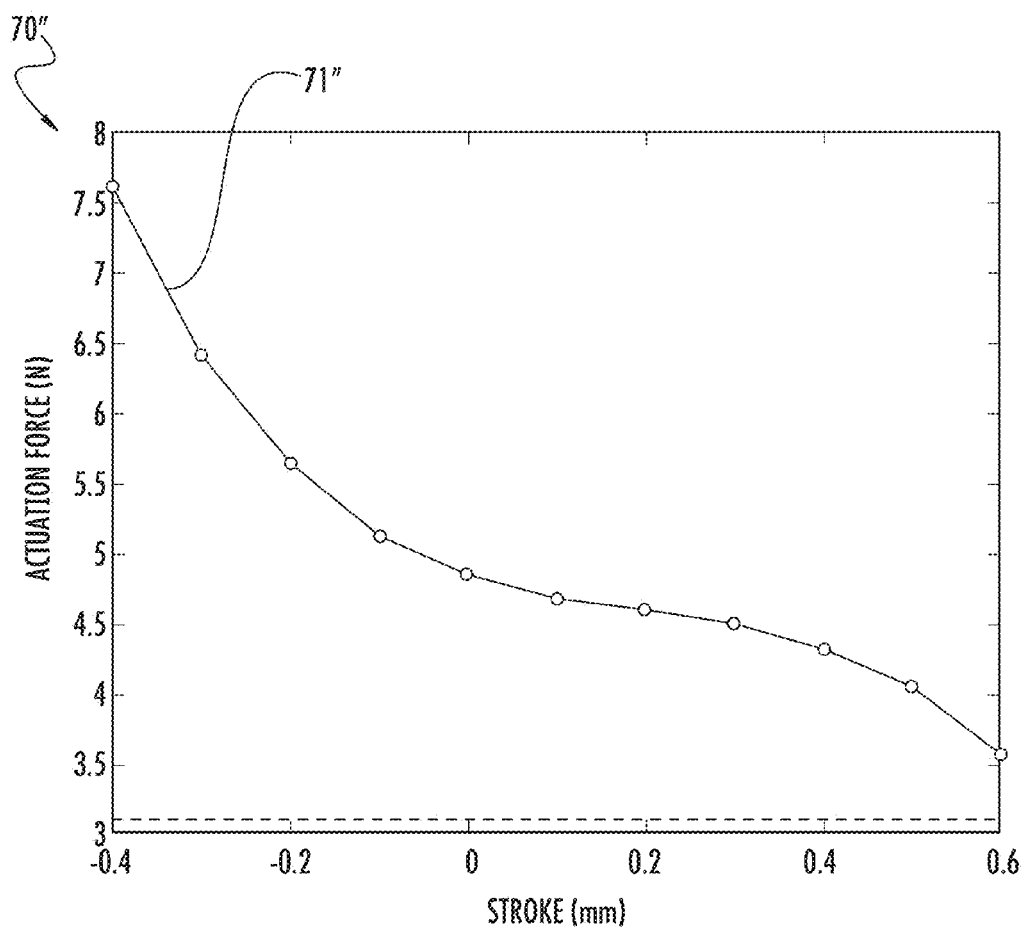
FIG. 21 is a graph of simulated stroke distance versus actuation force for the actuator of FIG. 16.

Referring additionally to FIGS. 19 and 20, simulated flux lines for the actuator 30" with the coil 36" off and on respectively are illustrated. The line 71" in graph 70" in FIG. 21 illustrates simulated stroke versus actuation force (excluding friction) of the actuator 30".

Figure 24:
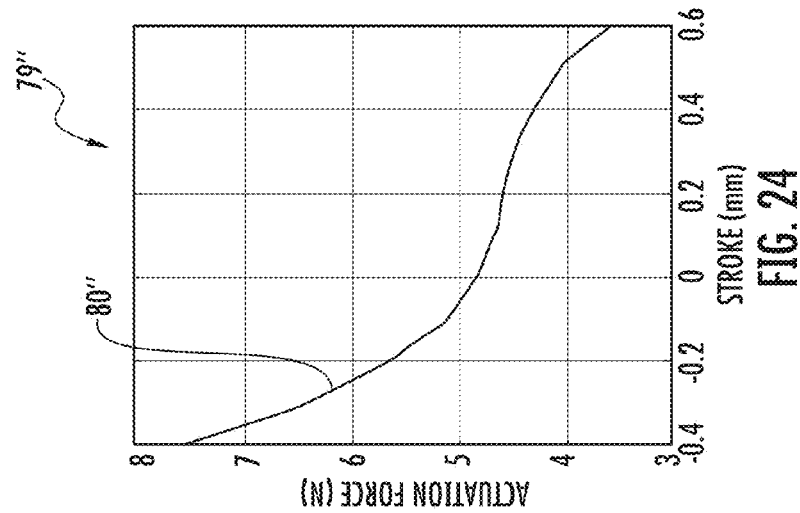
FIG. 24 is a graph of simulated stroke distance versus force according to an embodiment.
Figure 23:
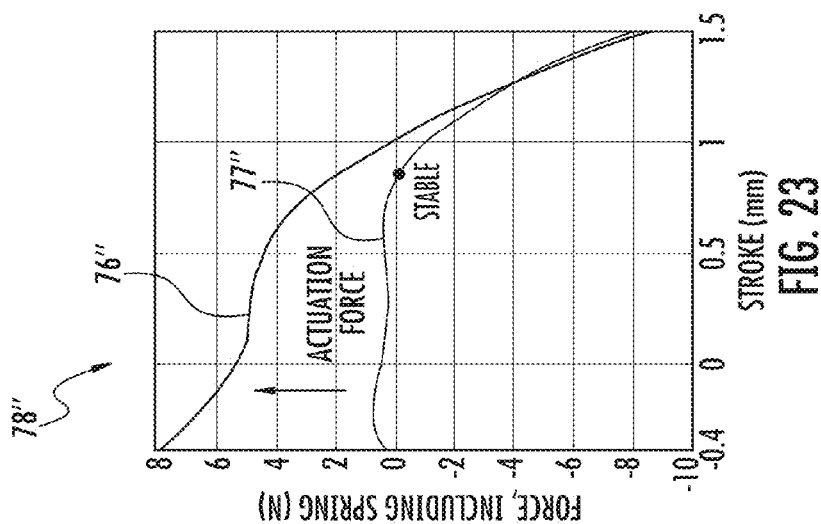
FIG. 23 is a graph of simulated stroke distance versus force according to an embodiment including a restoring biasing member.
Figure 22:
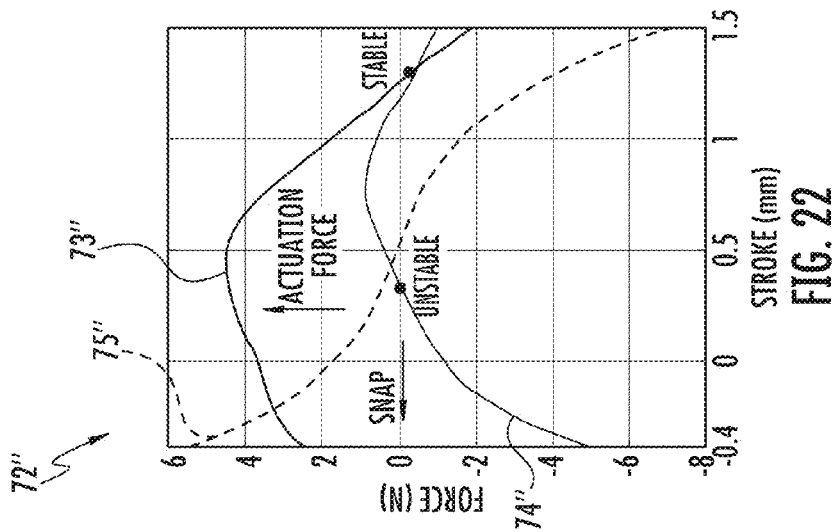
FIG. 22 is a graph of simulated stroke distance versus force according to an embodiment.

Referring now to the graph 72" in FIG. 22, the actuator 30" is naturally unstable, particularly in the z-direction, which may cause a "snapping" together of the actuator bottom 32" and the actuator top 37". The line 73" illustrates stroke versus force with the coil 36" enabled, while the line 74" illustrates stroke versus force with the coil disabled. Thus, it may be desirable to add a restoring biasing member, for example, a spring, to bias the actuator apart or upwards and to limit the upward travel range. The line 75" represents a desired stroke versus force. The lines 76" and 77" in the graph 78" in FIG. 23 illustrate stroke versus force with the coil 36" enabled and disabled, respectively. A restoring biasing member or spring provides upward biasing so that a stable equilibrium occurs at about +0.8 mm. The line 80" in the graph 79" in FIG. 24 illustrates stroke versus force with a stroke=0 corresponding to a nominal position. In this case, the coil 36" and the magnet 34" are aligned center-to-center in the z-axis direction.

Figure 25:
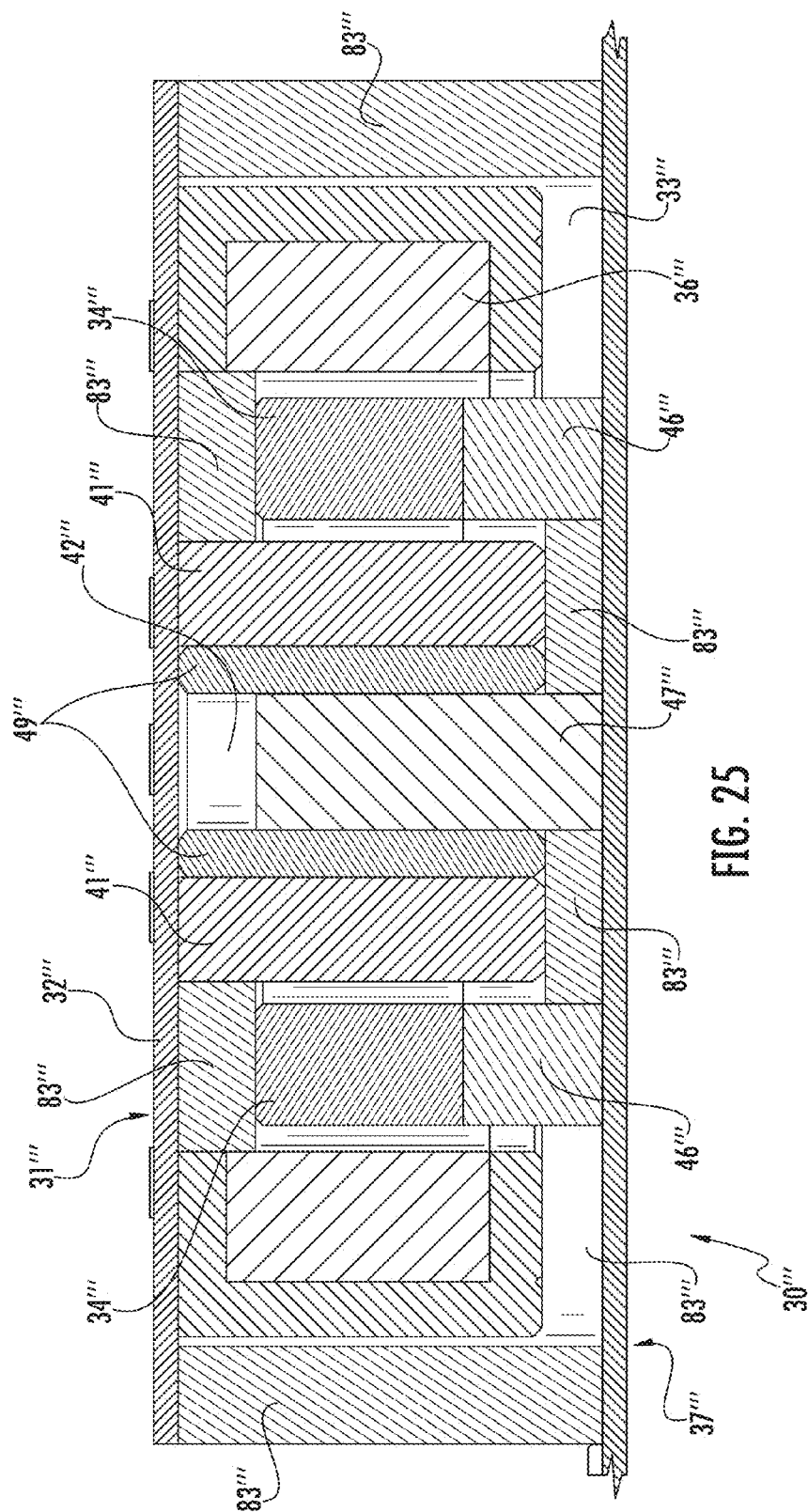
FIG. 25 is a side schematic cross-sectional view of an actuator including a restoring biasing member in accordance with an embodiment.
Figure 26:
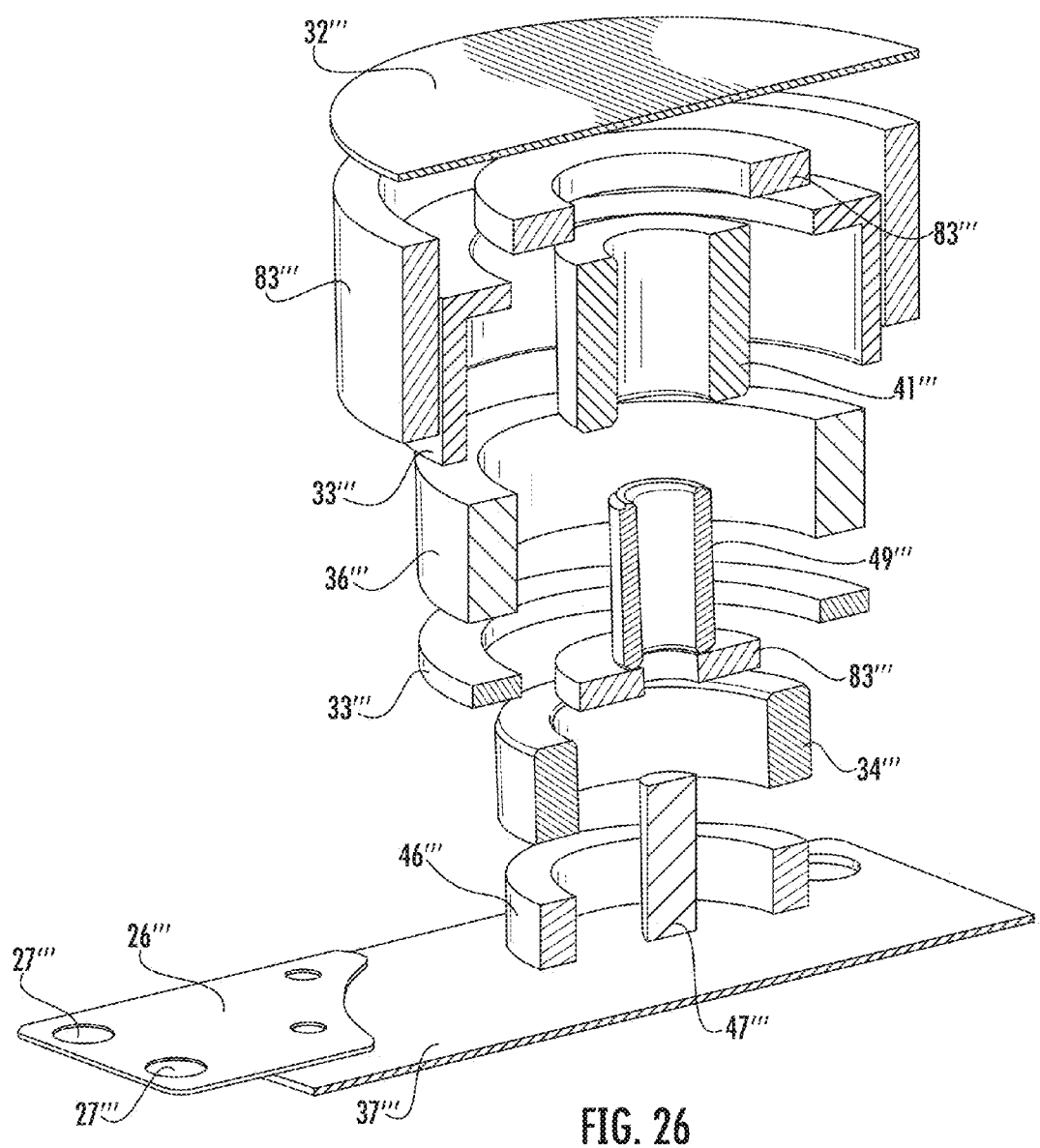
FIG. 26 is an exploded perspective cross-sectional view of an actuator including a restoring biasing member in accordance with an embodiment.

Referring now to FIGS. 25 and 26, it may thus be desirable to add a restoring biasing member 83''' (e.g., spring), in any one or more of several locations. For example, the restoring biasing member 83''' may be added in any one or more of outside the sidewall 33''' between the actuator top 37''' and the actuator bottom 32''', between the actuator top and the body 41''' of the first guide member 40''', and between the magnet 34''' and the actuator body 31''' or more particularly, the actuator bottom. Of course, any restoring biasing member 83''' may be located elsewhere and be in different forms, for example, shapes and sizes.

Figure 27:
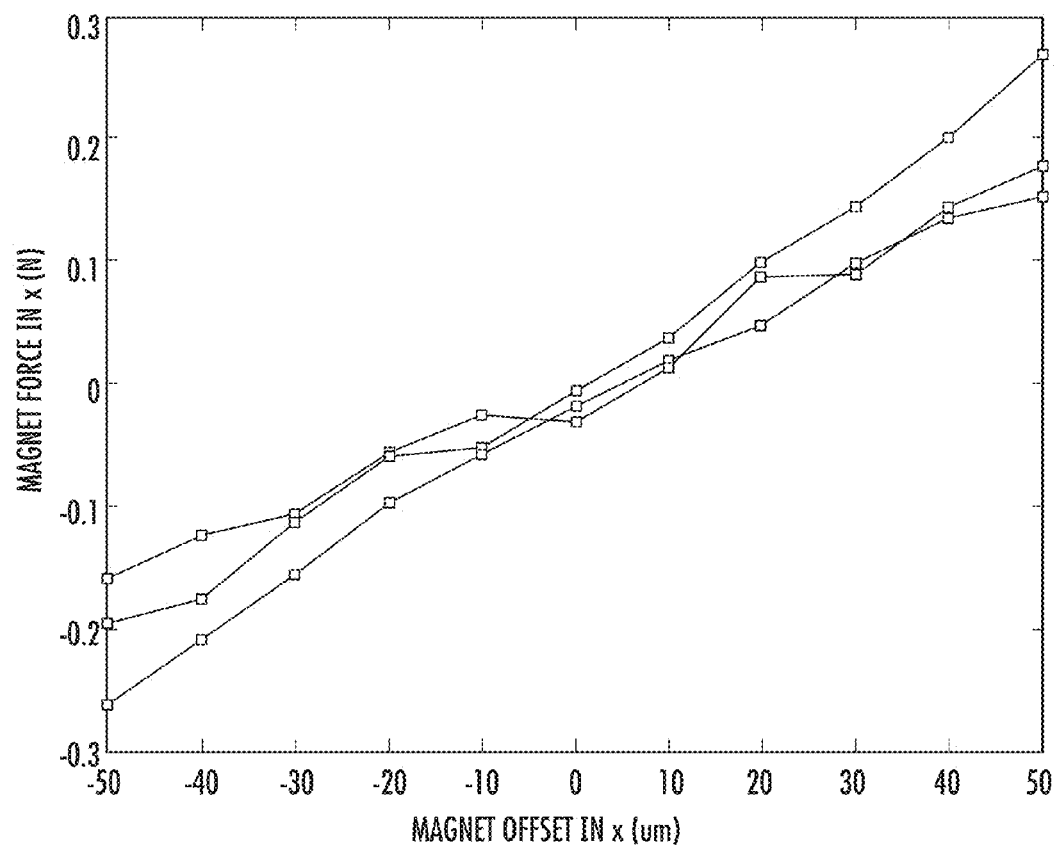
FIG. 27 is a graph of magnet offset versus magnet force illustrating in-plane restoring forces in accordance with an embodiment.

Referring now to the graph 90''' in FIG. 27, illustratively the in-plane restoring forces may be considered relatively modest. As previously described, the magnet 34''' is relatively unstable in x/y/theta plane, and the bearing insert 49''' or interface keeps the magnet aligned during assembly, operation, and blunt forces, for example, dropping. The in-plane forces are <0.3 N for +/−50 um magnet offsets. Assuming a 20% static coefficient of friction, there is less than a 0.06 N force loss to friction. The lines 91''', 92''', and 93''' illustrate z-offset as −345 microns, 0 microns, and 536 microns, respectively.

As will be understood by those skilled in the art, and in accordance with the embodiments described above, to achieve the relative movement of the actuator bottom 32 and the actuator top 37, either of the actuator bottom or actuator top may be coupled to or carried by the device housing 21 or adjacent the display 22 so that either the actuator bottom or the actuator top may be considered, conceptually, moving relative to the other.

A method aspect is directed to a method of making an actuator 30 to be coupled between a device housing 21 and a display 22 of an electronic device 20. The method includes forming an actuator body 31 having an actuator bottom 32 and a sidewall 33 extending upwardly therefrom. The method may also include positioning a first guide member 40 carried by the actuator bottom 32 and spaced inwardly from adjacent portions of the sidewall 33 to define a channel 35, and positioning a coil 36 carried by the sidewall. The method also includes positioning a magnet 34 to be moveable within the channel 35, and coupling an actuator top 37 to the magnet so that a second guide member 44 cooperates with the first guide member 40 and so that upon driving the coil 36, the actuator top and the actuator bottom 32 relatively move to thereby deform the display 22.

Figure 28:
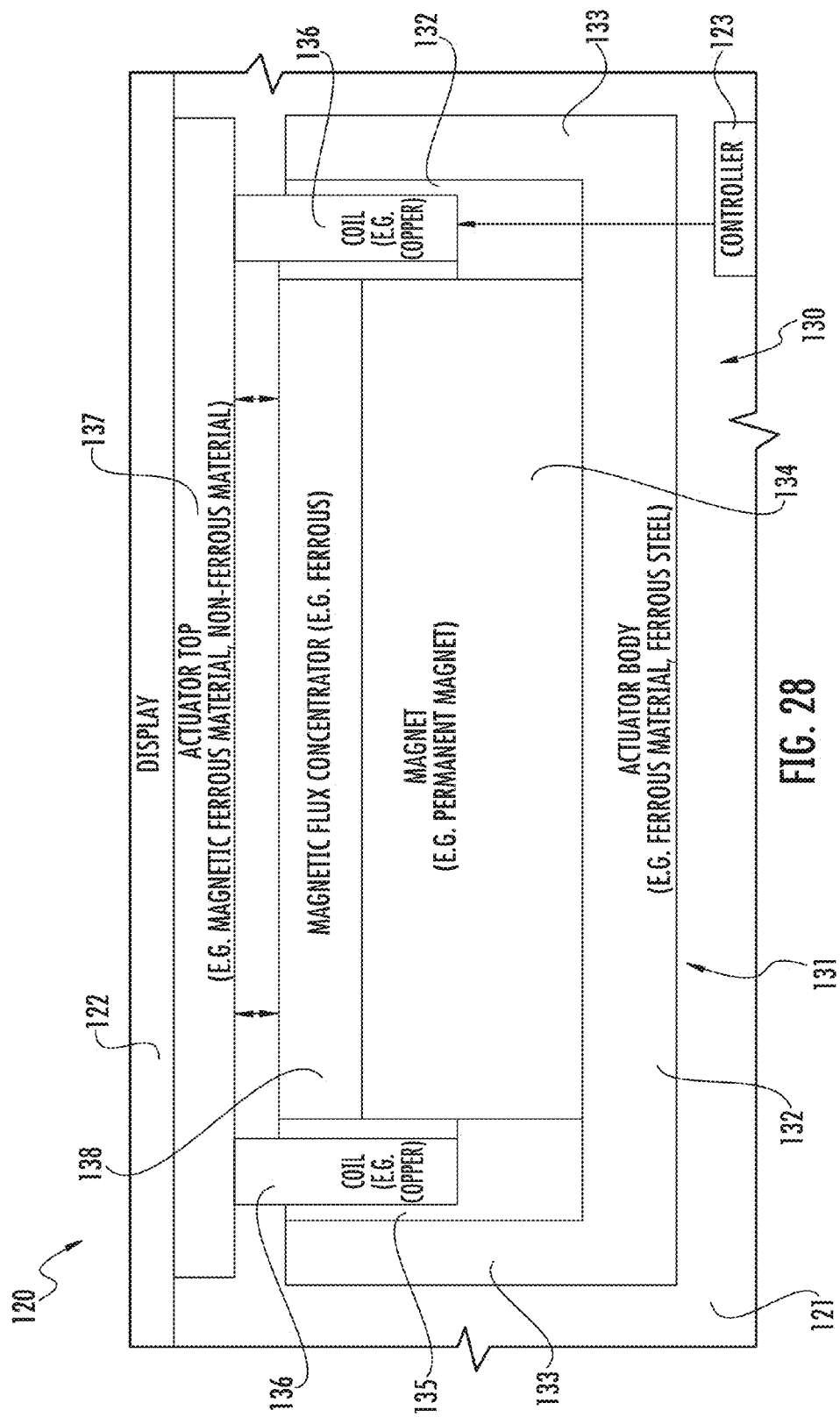
FIG. 28 is a portion of an electronic device including a schematic cross-sectional view of an actuator according to another embodiment.

Referring now to FIG. 28, in another embodiment, the electronic device 120 also includes an actuator 130 coupled between the device housing and the display 122. The actuator 130 includes an actuator body 131 having an actuator bottom 132 and a sidewall 133 extending upwardly therefrom. The sidewall 133 illustratively has a cylindrical shape or outline. The sidewall 133 may have another shape or outline, for example, rectangular. The actuator body 131 may include a ferrous material, for example, ferrous steel, in which case, the ferrous actuator body may operate as a magnetic field concentrator. The actuator body 131 may include other and/or additional materials.

A magnet 134 is carried by the actuator bottom 132 and is spaced inwardly from the sidewall 133 to define a channel 135. The magnet 134 may be a permanent magnet, for example. The magnet 134 may be an NdFeB magnet, for example. Of course, the magnet 134 may be another type of magnet. A magnetic flux concentrator 138 or body is carried by the magnet 134. The magnetic flux concentrator 138 may be ferrous or include ferrous material, for example.

A coil 136 is moveable within the channel 135. The coil 136 may include copper, for example. The coil 136 may include other and/or additional materials. Moreover, while a single coil 136 is illustrated, it should be understood that the actuator 130 may include more than one coil.

The actuator 130 also includes an actuator top 137 coupled to the coil 136. The actuator top 137 may include ferrous material and/or may be magnetic, for example. The actuator top 137 may include other and/or additional materials. The actuator top 137 may conceptually be considered a mass or force spreader, for example.

The controller 123 is configured to drive the coil 136 to relatively move the actuator bottom 132 and actuator top 137 to thereby deform the display 122. In other words, in operation, when haptic feedback is desired, the controller 123 drives the coil 136 so that the actuator top 137 moves away from or toward the bottom 132 of the actuator body 131 to apply a force, for example, from the backside, of the display 122 causing it to deform. If the controller 123 drives the coil 136 to move the actuator bottom 132 toward the actuator top 137 to thereby deform the display, it may be desirable that the actuator top be secured to the display 122, for example, by adhesive or other bonding or securing techniques. Alternatively, in some embodiments, the actuator top 137 may be biased against the display 122 by way of a biasing member, e.g., spring and/or other non-adhesive bonding technique. When the display 122 is in the form of a touch display, the controller 123 may drive the coil 136 to move the actuator bottom 132 and the actuator top 137 to deform the display based upon input from the touch display, for example.

For example, the controller 123 may drive the coil 136 to move the actuator bottom 132 and actuator top 137 apart at a frequency of about 250 Hz. Driving the actuator 130 at 250 Hz (e.g., direct or averaged) may provide increased feedback.

Of course, as will be appreciated by those skilled in the art, the waveform generated by the controller 123 for driving the actuator 130 determines the type of haptic feedback (e.g., how the feedback feels to a user). For example, the controller 123 may drive the actuator for a desired feedback (e.g., tap, vibe). The controller 123 may also drive the actuator 130 to deform the display 122 so that a user's finger when placed on the display adjacent the actuator, may feel as if there is a corresponding input device (e.g., pushbutton switch) by way of the deformation. Accordingly, when the display 122 is in the form of a touch display, user input adjacent the actuator 130 may perform functions, for example, of that of a "home" button.

Deformation of the display 122 of about 27 microns may correspond to a force of about 3 N-4 N for the electronic device 120. However, the amount of force may correspond to the type of electronic device. The amount of force applied to the display 122 to obtain a desired amount of deformation may also be based upon the thickness or elastic modulus of the display. For example, for a thicker display 122 more energy may be used to obtain a desired deformation relative to a thinner display. The type of materials included in the display 122 may also affect the amount of force for deforming the display a given amount. Alternatively or additionally, a larger sized actuator 130 may be used.

Figure 29:
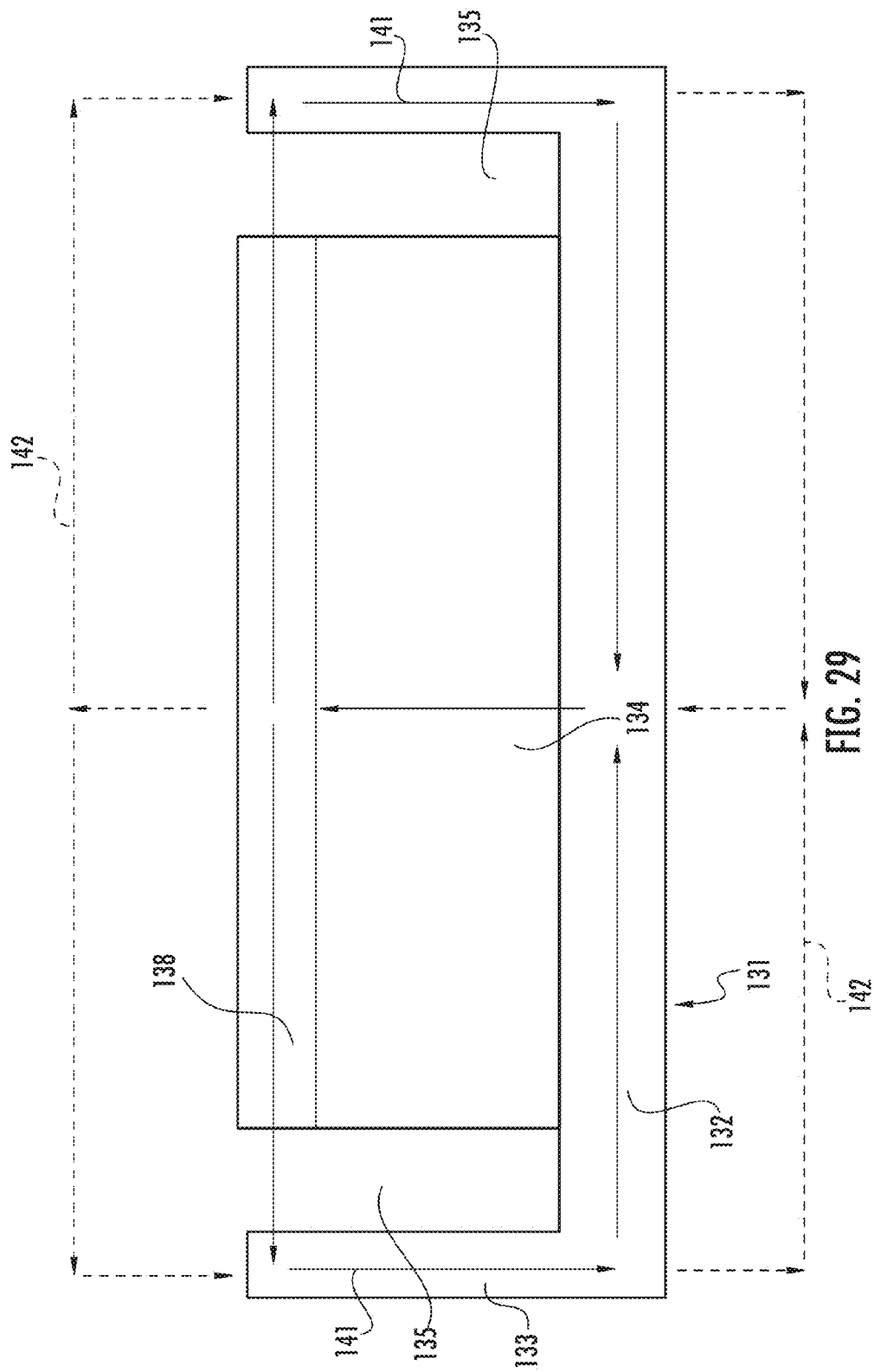
FIG. 29 is a portion of the actuator of FIG. 28 illustrating a desired magnetic flux path and undesired flux leakage.

Referring now additionally to FIG. 29, it may be desirable to control the magnetic flux generated by the actuator 130. For example, a desired magnetic flux path 141 and undesired flux leakage 142 are illustrated. The magnetic field generated by the magnet 134 forms a loop in three-dimensional space. The field magnitude may be characterized by its magnetic flux density. A portion of the flux may leak beyond the actuator 130, for example, and beyond the extent of or the desirable range of the electronic device 120, which may potentially affect nearby objects that may be sensitive to magnetic fields (e.g., credit cards, pacemakers). Accordingly, it may be desirable to control any undesired magnetic flux leakage.

Figure 30:
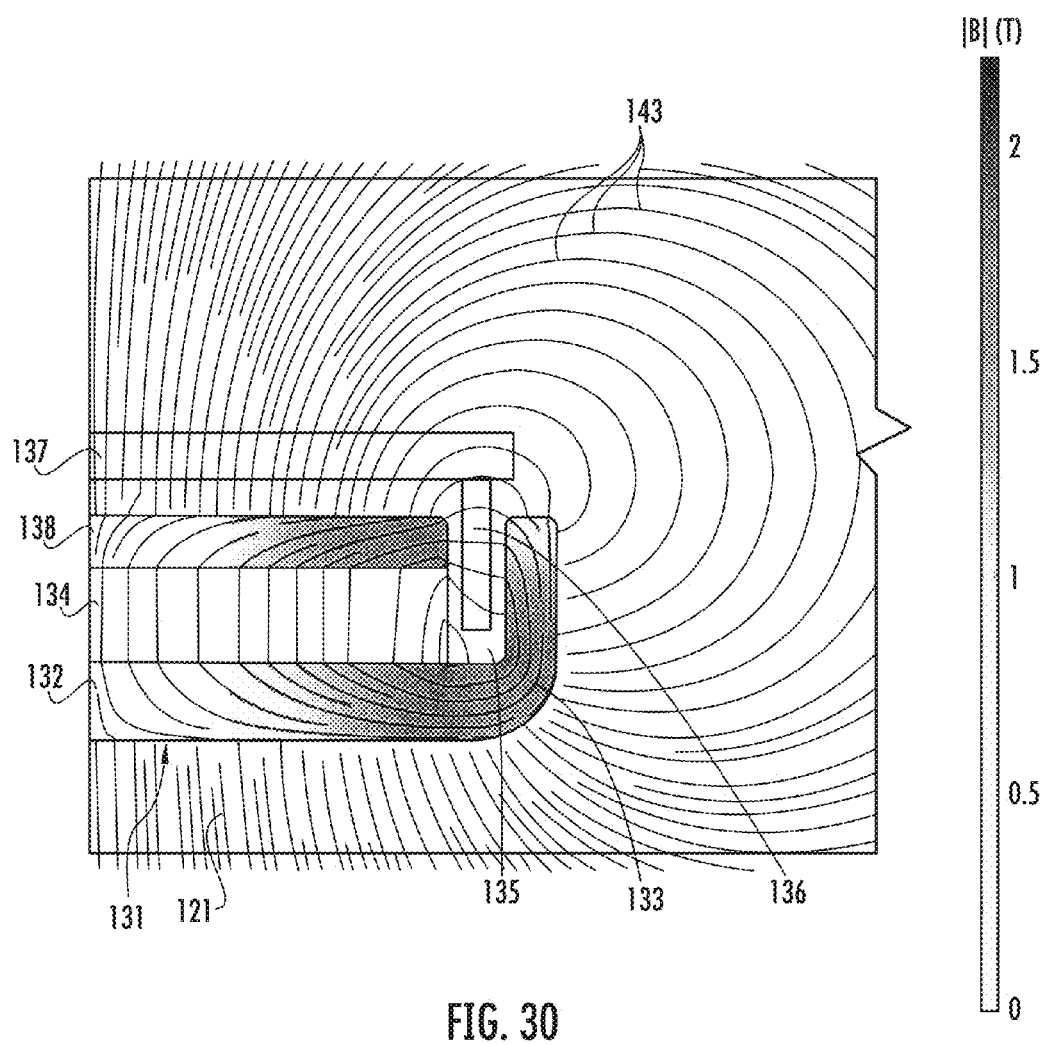
FIG. 30 is a diagram of simulated magnetic flux density and magnetic flux streamlines for an actuator according to an embodiment.
Figure 31:
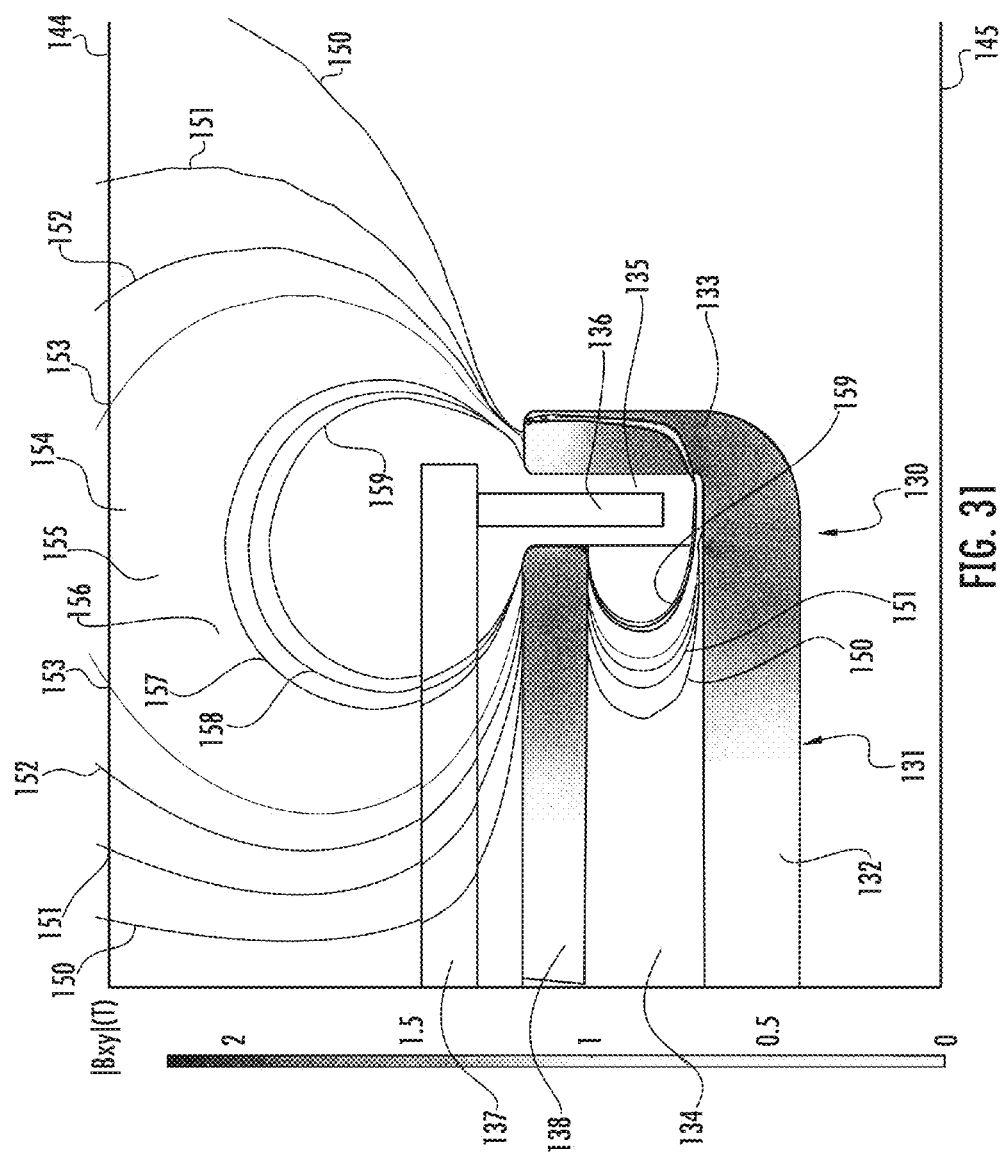
FIG. 31 is a diagram of simulated in-plane flux density for an actuator according to an embodiment.

Referring now additionally to the diagrams in FIGS. 30 and 31, for example, where the actuator top 137 does not include a ferrous or magnetic material, magnetic flux leakage is illustrated. The magnetic flux density and magnetic flux streamlines 143 are illustrated in FIG. 30.

With respect to FIG. 31, the simulated in-plane flux density may be of particular interest for estimating the impact of flux leakage on adjacent devices. There may be a specific value for the maximum desirable in-plane flux leakage above (144) and below (145) the actuator 130. As shown, the flux leakage is 240 G towards the front of the actuator 130. The lines 150, 151, 152, 153, 154, 155, 156, 157, 158, and 159 correspond to a flux leakage of 50, 100, 150, 250, 300, 350, 400, 450, and 500 G (i.e., $|B_{xy}|(G)$), respectively. The corresponding force generation is 2.5 N with a figure of merit being 10.4 N/kG.

Figure 32:
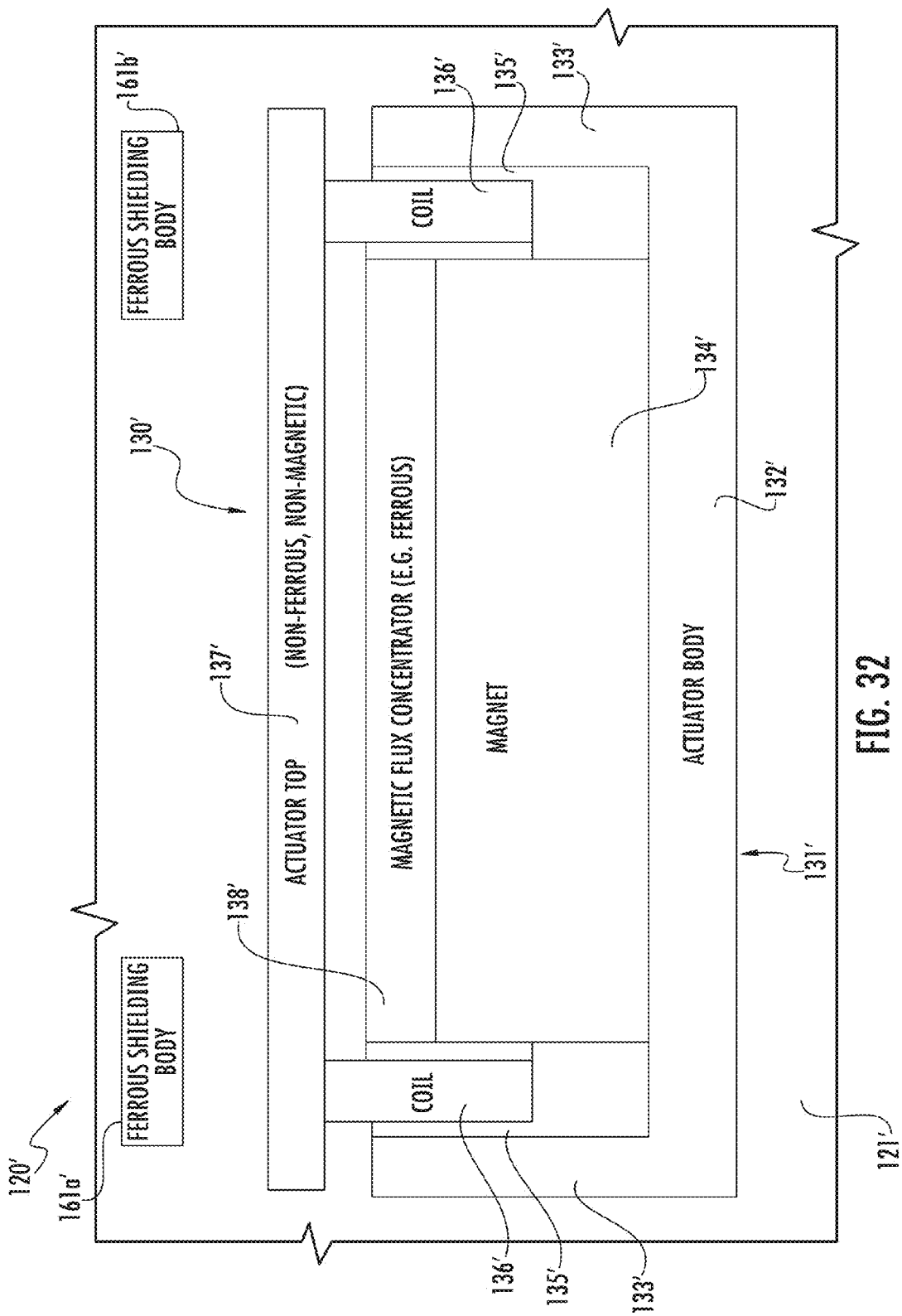
FIG. 32 is a schematic cross-sectional view of an actuator and ferrous shielding bodies according to another embodiment.

Referring now briefly to FIG. 32, in an embodiment where the actuator top 137' is not ferrous or magnetic, to reduce flux leakage, the electronic device 120' may include ferrous shielding bodies 161a', 161b' carried within the device housing 121' adjacent the actuator 130'. While two ferrous shielding bodies 161a', 161b' are illustrated, those skilled in the art will appreciate that there may be any number of ferrous shielding bodies which may be carried within the device housing 121' and spaced from the actuator 130' to provide increased flux leakage control, for example.

Figure 33:
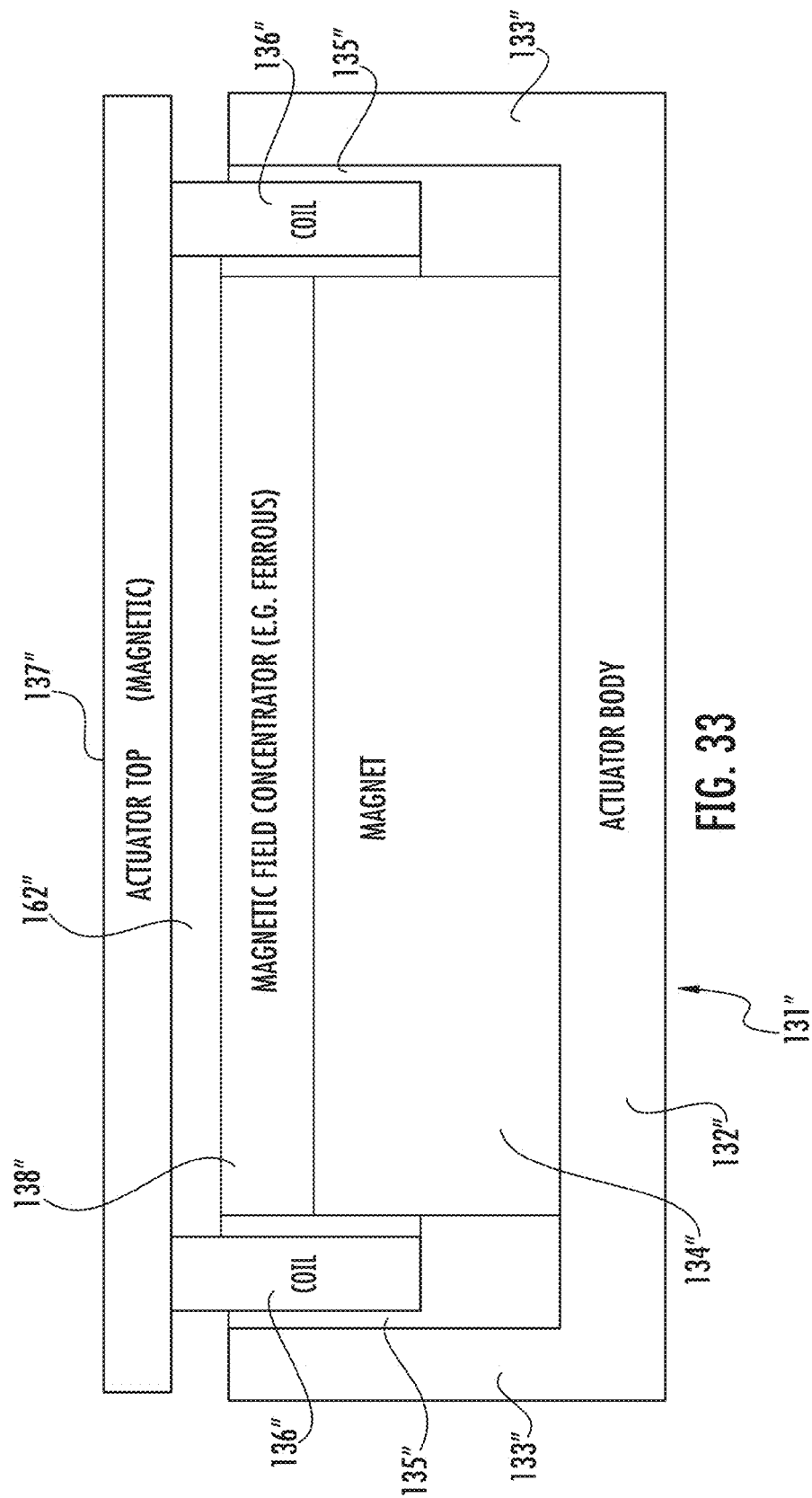
FIG. 33 is a schematic cross-sectional view of an actuator according to another embodiment.

Referring now to FIG. 33, in another embodiment, to further control or reduce undesirable flux leakage, the actuator top 137" is magnetic. The polarization direction of the magnetic actuator top 137" (i.e. shielding magnet) is oriented opposite from the magnet 134", which results in destructive interference. In some applications, for example, audio at 20 kHz, using a moving actuator top 137" may be not desirable. In lower bandwidth applications, for example, <1 kHz for haptics, the actuator top 137" or moving mass can be increased permitting it to be magnetic. A small gap 162" between the magnet 134" and magnetic actuator top 137" along with opposing polarity provides a relatively large reduction in flux leakage.

Figure 34:
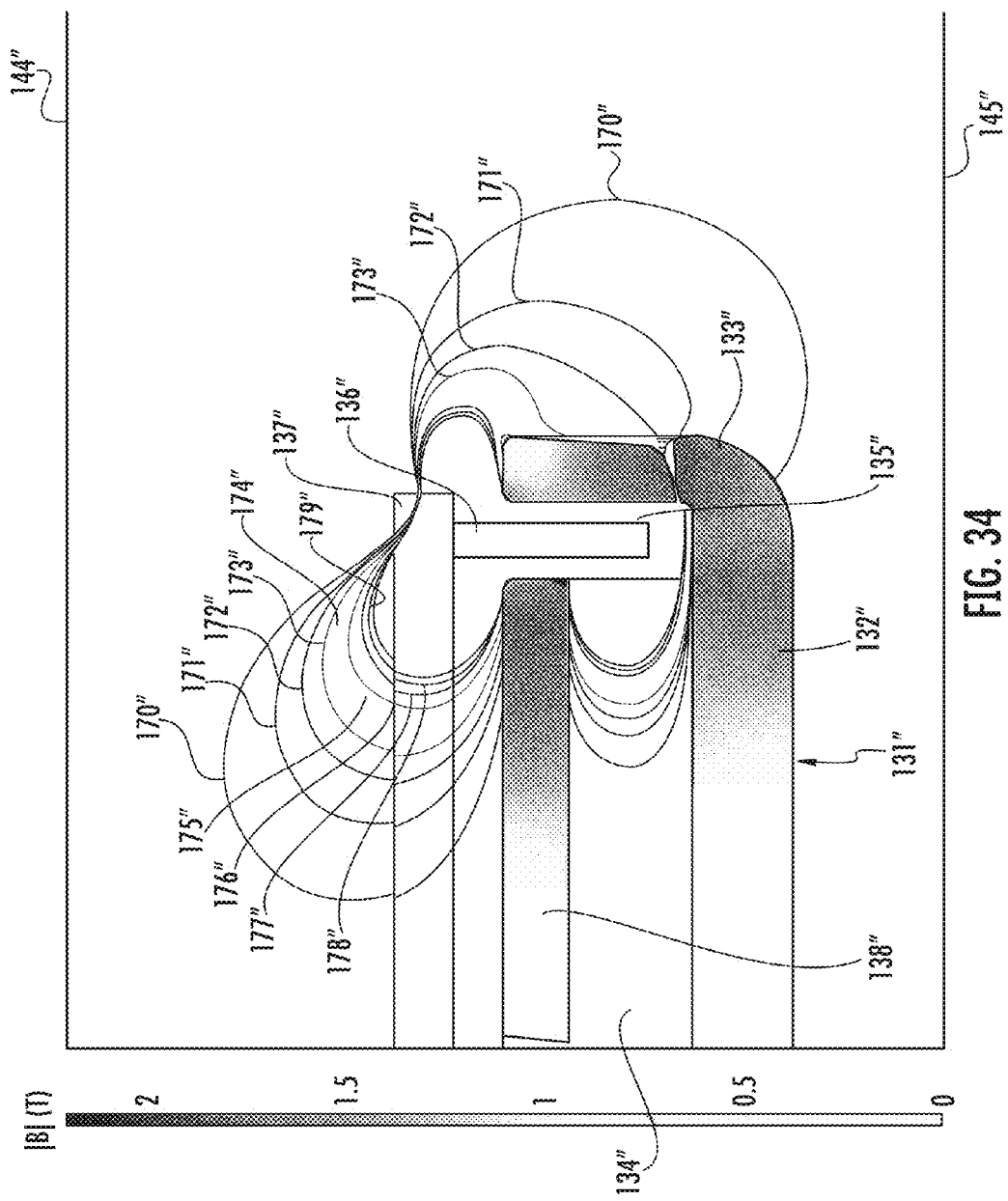
FIG. 34 is a diagram of simulated in-plane flux density for the actuator in FIG. 33.

Referring to the graph in FIG. 34 simulated flux leakage of an actuator 130" with a magnetic actuator top 137" is illustrated. As shown the leakage is 1.4 G. The lines 170", 171", 172", 173", 174", 175", 176", 177", 178', and 179" correspond to a flux leakage of 50, 100, 150, 250, 300, 350, 400, 450, and 500 G (i.e., $|B_{xy}|(G)$), respectively. The corresponding force generation is 2.9 N, with a figure of merit being 2071 N/kG. Indeed, by making the actuator top 137" magnetic, force generation may be increased and flux leakage may be reduced by several orders of a magnitude. Maximum desirable in-plane flux leakage thresholds above (144") and below (145") the actuator 130" are illustrated, for example, for comparison with an actuator without a magnetic actuator top (FIG. 33).

Referring now to FIG. 35, in another embodiment, the actuator 130''' includes a suspension system 147''' that illustratively includes a base 148''' and a suspension element 149''' coupled between the base and the actuator top 137'''. The suspension system 147''' may include polyetheretherketone (PEEK) or other material, and may operate as a damper, for example.

A method aspect is directed to a method of making an actuator 130 to be coupled between a device housing 121 and a display 122 of an electronic device 120. The method includes forming an actuator body 131 having an actuator bottom 132 and a sidewall 133 extending upwardly therefrom and positioning a magnet 134 carried by the actuator bottom and spaced inwardly from adjacent portions of the sidewall to define a channel 135. The method may also include positioning a coil 136 that is moveable within the channel 135 and coupling an actuator top 137 to the coil so that upon driving the coil, the actuator top and the actuator bottom 132 relatively move to thereby deform the display 122.

While several exemplary embodiments have been described herein whereby the actuator top 37 is moved from the bottom to deform (e.g., is driven against or contact with) the display 22, it should be appreciated by those skilled in the art that the actuator may be positioned so that the actuator body 31 is adjacent, in direct contact with, or otherwise deforms the display. In other words, the orientation of the actuator 30 with respect to the display 22 may be reversed. Moreover, it should be understood that there may be an intervening body, for example, between the actuator 30 and the display 22 so that the bottom 32 and actuator top 37 relatively moving causes the intervening body to deform the display.

Still further, while the electronic device 20 has been described with respect to a single actuator 30, the electronic device may have more than one actuator. For example, the electronic device 20 may include an array of actuators spaced apart within the device housing 21, and the controller may selectively operate each of the actuators in the array for a desired feel or type of feedback.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
   a device housing;
   a display carried by the device housing;
   an actuator carried between the device housing and the display and comprising
      an actuator body having an actuator bottom and a sidewall extending upwardly therefrom,
      a first guide member carried by the actuator bottom and spaced inwardly from adjacent portions of the sidewall to define a channel,
      at least one coil carried by the sidewall,
      a magnet being moveable within the channel, and
      an actuator top coupled to the magnet and comprising a second guide member cooperating with the first guide member; and a controller configured to drive the at least one coil to relatively move the actuator bottom and actuator top to thereby deform the display.

2. The electronic device of claim 1 wherein the first guide member comprises a body having a passageway therein.

3. The electronic device of claim 1 wherein the second guide member comprises a projection received within the passageway of the body.

4. The electronic device of claim 1 wherein the actuator further comprises at least one biasing member carried within the passageway of the body.

5. The electronic device of claim 1 wherein the actuator top comprises a top plate and a spacer between the top plate and magnet.

6. The electronic device of claim 1 wherein the actuator body comprises a ferrous material.

7. The electronic device of claim 1 wherein the actuator body comprises ferrous steel.

8. The electronic device of claim 1 wherein the sidewall of the actuator has a cylindrical shape.

9. The electronic device of claim 1 wherein the at least one coil comprises copper.

10. The electronic device of claim 1 wherein the actuator top comprises a ferrous material.

11. The electronic device of claim 1 wherein the actuator top comprises a magnetic actuator top.

12. The electronic device of claim 1 wherein the magnet comprises a permanent magnet.

13. The electronic device of claim 1 wherein the display comprises a touch display.

14. An actuator to be carried between a device housing and a display of an electronic device, the actuator comprising:
   an actuator body having an actuator bottom and a sidewall extending upwardly therefrom;
   a first guide member carried by the actuator bottom and spaced inwardly from adjacent portions of the sidewall to define a channel;
   at least one coil carried by the sidewall;
   a magnet being moveable within the channel; and
   an actuator top coupled to the magnet and comprising a second guide member cooperating with the first guide member, the actuator top configured to move relative to the actuator bottom to thereby deform the display based upon driving the at least one coil.

15. The actuator of claim 14 wherein the first guide member comprises a body having a passageway therein.

16. The actuator of claim 14 wherein the second guide member comprises a projection received within the passageway of the body.

17. The actuator of claim 14 further comprising at least one biasing member carried within the passageway of the body.

18. The actuator of claim 14 wherein the actuator top comprises a top plate and a spacer between the top plate and magnet.

19. A method of making an actuator to be coupled between a device housing and a display of an electronic device, the method comprising:
   forming an actuator body having an actuator bottom and a sidewall extending upwardly therefrom;
   positioning a first guide member carried by the actuator bottom and spaced inwardly from adjacent portions of the sidewall to define a channel;
   positioning at least one coil carried by the sidewall,
   positioning a magnet to be moveable within the channel; and
   coupling an actuator top to the magnet so that a second guide member cooperates with the first guide member and so that upon driving the at least one coil, the actuator top and the actuator bottom relatively move to thereby deform the display.

20. The method of claim 19 wherein the first guide member comprises a body having a passageway therein.

21. The method of claim 19 wherein the second guide member comprises a projection received within the passageway of the body.

22. The method of claim 19 further comprising positioning at least one biasing member carried within the passageway of the body.

23. The method of claim 19 wherein the actuator top comprises a top plate and a spacer between the top plate and magnet.

\* \* \* \* \*